US012757132B2

(12) United States Patent
Liu et al.

(10) Patent No.: US 12,757,132 B2
(45) Date of Patent: Oct. 6, 2026

(54) AUTOMATIC GAIN CONTROL DESIGNS FOR SIDELINK FEEDBACK

(71) Applicant: QUALCOMM Incorporated, San Diego, CA (US)

(72) Inventors: Chih-Hao Liu, San Diego, CA (US); Xiaoxia Zhang, San Diego, CA (US); Jing Sun, San Diego, CA (US); Yisheng Xue, San Diego, CA (US); Giovanni Chisci, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 364 days.

(21) Appl. No.: 18/447,815

(22) Filed: Aug. 10, 2023

(65) Prior Publication Data

US 2025/0056433 A1 Feb. 13, 2025

(51) Int. Cl.

| | |
|---|---|
| ***H04W 52/52*** | (2009.01) |
| ***H04W 52/32*** | (2009.01) |
| ***H04W 72/232*** | (2023.01) |
| ***H04W 72/25*** | (2023.01) |

(52) U.S. Cl.

CPC ......... *H04W 52/52* (2013.01); *H04W 52/325* (2013.01); *H04W 72/232* (2023.01); *H04W 72/25* (2023.01)

(58) Field of Classification Search

CPC . H04W 52/52; H04W 52/325; H04W 72/232; H04W 72/25; H04W 72/1263

See application file for complete search history.

(56) References Cited

U.S. PATENT DOCUMENTS

| | | | | |
|---|---|---|---|---|
| 2021/0314933 | A1* | 10/2021 | Zhang | H04W 72/20 |
| 2022/0158803 | A1* | 5/2022 | Ji | H04L 27/2602 |
| 2022/0224491 | A1* | 7/2022 | Salim | H04L 1/1854 |
| 2023/0067706 | A1* | 3/2023 | Liu | H04L 5/0094 |
| 2023/0171750 | A1* | 6/2023 | Lee | H04L 5/005 370/329 |
| 2023/0188164 | A1* | 6/2023 | Liu | H04L 1/1861 714/752 |
| 2023/0224900 | A1* | 7/2023 | Elshafie | H04L 1/1896 |
| 2025/0330984 | A1* | 10/2025 | Ye | H04L 5/0051 |

* cited by examiner

*Primary Examiner* — Angelica Perez

(74) *Attorney, Agent, or Firm* — QUALCOMM Incorporated

(57) ABSTRACT

Methods, systems, and devices for wireless communications are described. A user equipment may receive a signal in an automatic gain control resource and may receive a physical sidelink feedback channel message based on a gain for reception of the first physical sidelink feedback channel message, where the gain is based on receiving the signal. In some aspects, the first physical sidelink feedback channel message may be one of a set of physical sidelink feedback channel messages time-division multiplexed over a set of contiguous time resources. Additionally, or alternatively, the user equipment may receive a sidelink message after receiving the physical sidelink feedback channel message using a second gain, where the second gain is based on receiving a second signal in a second automatic gain control resource that occurs before the first automatic gain control resource.

30 Claims, 17 Drawing Sheets

AUTOMATIC GAIN CONTROL DESIGNS FOR SIDELINK FEEDBACK

FIELD OF TECHNOLOGY

The following relates to wireless communications, including automatic gain control designs for sidelink feedback.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Aspects of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some aspects, a first user equipment (UE) may perform automatic gain control (AGC) training. For instance, if the first UE is to receive a message from a second UE, the first UE may receive an AGC signal from the first UE and may use the received AGC signal for determining a gain for receiving the message. As a duration of the message decreases relative to a duration over which AGC training is performed, the efficiency of wireless communications may also decrease.

SUMMARY

The present disclosure relates to improved methods, systems, devices, and apparatuses that support automatic gain control designs for sidelink feedback. For instance, the described techniques provide for a user equipment (UE) to communicate a greater number of sidelink messages over a time duration in which automatic gain control (AGC) training is applied. For instance, a UE may receive a signal in an AGC resource and may receive a first PSFCH message based on a gain for reception of the first PSFCH message. The gain for reception of the first PSFCH message may be based on receiving the signal and the first PSFCH message may be one of a set of PSFCH messages that are time-division multiplexed over a set of contiguous time resources. A starting time resource of the set of contiguous time resources may be contiguous with the AGC resource, and a first time period spanned by the AGC resource may be greater than a second time period spanned by each PSFCH message of the set of PSFCH messages.

Additionally, or alternatively, a UE may receive a first signal in a first AGC resource and may receive a first sidelink message over a first time resource contiguous with the first AGC resource using a gain for reception of the first sidelink message. The gain may be based on receiving the first signal and the first sidelink message may be associated with a control channel or a shared channel. The UE may transmit a second signal in a second AGC resource and may transmit a physical sidelink feedback channel (PSFCH) message over a second time resource occurring after the second AGC resource based on transmitting the second signal. The UE may receive a second sidelink message over a third time resource using the gain based on receiving the first signal. In some aspects, the third time resource may occur after the second time resource and the second time resource may occur after the first time resource.

A method for wireless communications by an apparatus is described. The method may include receiving a signal in an automatic gain control (AGC) resource and receiving a first PSFCH message based on a gain for reception of the first PSFCH message, where the gain for reception of the first PSFCH message is based on receiving the signal, where the first PSFCH message is one of a set of multiple PSFCH messages that are time-division multiplexed over a set of multiple contiguous time resources, where a starting time resource of the set of multiple contiguous time resources is contiguous with the AGC resource, and where a first time period spanned by the AGC resource is greater than a second time period spanned by each PSFCH message of the set of multiple PSFCH messages.

An apparatus for wireless communications is described. The apparatus may include one or more memories storing processor executable code, and one or more processors coupled with the one or more memories. The one or more processors may be operable to execute the code to cause the one or more processors, individually or collectively, to receive a signal in an automatic gain control (AGC) resource and receive a first PSFCH message based on a gain for reception of the first PSFCH message, where the gain for reception of the first PSFCH message is based on receiving the signal, where the first PSFCH message is one of a set of multiple PSFCH messages that are time-division multiplexed over a set of multiple contiguous time resources, where a starting time resource of the set of multiple contiguous time resources is contiguous with the AGC resource, and where a first time period spanned by the AGC resource is greater than a second time period spanned by each PSFCH message of the set of multiple PSFCH messages.

Another apparatus for wireless communications is described. The apparatus may include means for receiving a signal in an automatic gain control (AGC) resource and means for receiving a first PSFCH message based on a gain for reception of the first PSFCH message, where the gain for reception of the first PSFCH message is based on receiving the signal, where the first PSFCH message is one of a set of multiple PSFCH messages that are time-division multiplexed over a set of multiple contiguous time resources, where a starting time resource of the set of multiple contiguous time resources is contiguous with the AGC resource, and where a first time period spanned by the AGC resource is greater than a second time period spanned by each PSFCH message of the set of multiple PSFCH messages.

A non-transitory computer-readable medium storing code for wireless communications is described. The code may include instructions executable by a processor to receive a signal in an automatic gain control (AGC) resource and receive a first PSFCH message based on a gain for reception of the first PSFCH message, where the gain for reception of the first PSFCH message is based on receiving the signal, where the first PSFCH message is one of a set of multiple PSFCH messages that are time-division multiplexed over a set of multiple contiguous time resources, where a starting time resource of the set of multiple contiguous time resources is contiguous with the AGC resource, and where a first time period spanned by the AGC resource is greater than a second time period spanned by each PSFCH message of the set of multiple PSFCH messages.

In some examples of the method, apparatus, and non-transitory computer-readable medium described herein, the AGC resource includes a set of multiple symbol sets, each symbol set of the set of multiple symbol sets maps to a respective time resource of the set of multiple contiguous time resources, and receiving the first PSFCH message over a first time resource of the set of multiple contiguous time resources may be based on the first time resource mapping to a symbol set of the set of multiple symbol sets.

In some examples of the method, apparatus, and non-transitory computer-readable medium described herein, the AGC resource includes a set of multiple sets of contiguous resource blocks, each set of contiguous resource blocks maps to a respective time resource of the set of multiple contiguous time resources, and receiving the first PSFCH message over a first time resource of the set of multiple contiguous time resources may be based on the first time resource mapping to a set of contiguous resource blocks of the set of multiple sets of contiguous resource blocks.

Some examples of the method, apparatus, and non-transitory computer-readable medium described herein may further include operations, features, means, or instructions for receiving the signal may be based on a first frequency comb index of a set of multiple frequency comb indices, each frequency comb index of the set of multiple frequency comb indices maps to a respective time resource of the set of multiple contiguous time resources, and receiving the first PSFCH message over a first time resource of the set of multiple contiguous time resources may be based on the first time resource mapping to the first frequency comb index of the set of multiple frequency comb indices.

Some examples of the method, apparatus, and non-transitory computer-readable medium described herein may further include operations, features, means, or instructions for receiving the signal may be based on a first sequence index of a set of multiple sequence indices, each sequence index of the set of multiple sequence indices maps to a respective time resource of the set of multiple contiguous time resources, and receiving the first PSFCH message over a first time resource of the set of multiple contiguous time resources may be based on the first time resource mapping to the first sequence index of the set of multiple sequence indices.

In some examples of the method, apparatus, and non-transitory computer-readable medium described herein, each sequence index of the set of multiple sequence indices includes a respective cyclic shift index.

In some examples of the method, apparatus, and non-transitory computer-readable medium described herein, the signal includes a reference signal associated with a Chu sequence or a pseudo-random sequence.

In some examples of the method, apparatus, and non-transitory computer-readable medium described herein, a first bandwidth spanned by the signal in the AGC resource may be greater than a respective bandwidth spanned by each of the set of multiple PSFCH messages.

In some examples of the method, apparatus, and non-transitory computer-readable medium described herein, the AGC resource spans a first duration of a slot, a second duration of a set of multiple symbols, or both.

In some examples of the method, apparatus, and non-transitory computer-readable medium described herein, each time resource of the set of multiple contiguous time resources spans a duration of a symbol or a multiple of the duration of the symbol.

A method for wireless communications by an apparatus is described. The method may include receiving a first signal in a first automatic gain control (AGC) resource, receiving a first sidelink message over a first time resource contiguous with the first AGC resource using a gain for reception of the first sidelink message, where the gain is based on based on receiving the first signal, and where the first sidelink message is associated with control channel or a shared channel, transmitting a second signal in a second AGC resource, transmitting a physical sidelink feedback channel (PSFCH) message over a second time resource occurring after the second AGC resource based on transmitting the second signal, and receiving a second sidelink message over a third time resource using the gain based on receiving the first signal, where the third time resource occurs after the second time resource, and where the second time resource occurs after the first time resource.

An apparatus for wireless communications is described. The apparatus may include one or more memories storing processor executable code, and one or more processors coupled with the one or more memories. The one or more processors may be operable to execute the code to cause the one or more processors, individually or collectively, to receive a first signal in a first automatic gain control (AGC) resource, receive a first sidelink message over a first time resource contiguous with the first AGC resource using a gain for reception of the first sidelink message, where the gain is based on based on receiving the first signal, and where the first sidelink message is associated with control channel or a shared channel, transmit a second signal in a second AGC resource, transmit a physical sidelink feedback channel (PSFCH) message over a second time resource occurring after the second AGC resource based on transmitting the second signal, and receive a second sidelink message over a third time resource using the gain based on receiving the first signal, where the third time resource occurs after the second time resource, and where the second time resource occurs after the first time resource.

Another apparatus for wireless communications is described. The apparatus may include means for receiving a first signal in a first automatic gain control (AGC) resource, means for receiving a first sidelink message over a first time resource contiguous with the first AGC resource using a gain for reception of the first sidelink message, where the gain is based on based on receiving the first signal, and where the first sidelink message is associated with control channel or a shared channel, means for transmitting a second signal in a second AGC resource, means for transmitting a physical sidelink feedback channel (PSFCH) message over a second time resource occurring after the second AGC resource based on transmitting the second signal, and means for receiving a second sidelink message over a third time resource using the gain based on receiving the first signal, where the third time resource occurs after the second time resource, and where the second time resource occurs after the first time resource.

A non-transitory computer-readable medium storing code for wireless communications is described. The code may include instructions executable by a processor to receive a first signal in a first automatic gain control (AGC) resource, receive a first sidelink message over a first time resource contiguous with the first AGC resource using a gain for reception of the first sidelink message, where the gain is based on based on receiving the first signal, and where the first sidelink message is associated with control channel or a shared channel, transmit a second signal in a second AGC resource, transmit a physical sidelink feedback channel (PSFCH) message over a second time resource occurring after the second AGC resource based on transmitting the second signal, and receive a second sidelink message over a third time resource using the gain based on receiving the first signal, where the third time resource occurs after the second time resource, and where the second time resource occurs after the first time resource.

In some examples of the method, apparatus, and non-transitory computer-readable medium described herein, the second time resource may be contiguous with the second AGC resource.

In some examples of the method, apparatus, and non-transitory computer-readable medium described herein, the second time resource may be non-contiguous with the third time resource.

In some examples of the method, apparatus, and non-transitory computer-readable medium described herein, the first time resource, the second time resource, and the third time resource each span a duration of a symbol or a multiple of the duration of the symbol.

In some examples of the method, apparatus, and non-transitory computer-readable medium described herein, the first AGC resource and the second AGC resource each span a duration of a slot.

In some examples of the method, apparatus, and non-transitory computer-readable medium described herein, the second sidelink message may be associated with the control channel or the shared channel.

A method for wireless communications by an apparatus is described. The method may include transmitting a signal in an automatic gain control (AGC) resource and transmitting a first PSFCH message based on transmitting the signal in the AGC resource, where the first PSFCH message is one of a set of multiple PSFCH messages that are time-division multiplexed over a set of multiple contiguous time resources, where a starting time resource of the set of multiple contiguous time resources is contiguous with the AGC resource, and where a first time period spanned by the AGC resource is greater than a second time period spanned by each PSFCH message of the set of multiple PSFCH messages.

An apparatus for wireless communications is described. The apparatus may include one or more memories storing processor executable code, and one or more processors coupled with the one or more memories. The one or more processors may be operable to execute the code to cause the one or more processors, individually or collectively, to transmit a signal in an automatic gain control (AGC) resource and transmit a first PSFCH message based on transmitting the signal in the AGC resource, where the first PSFCH message is one of a set of multiple PSFCH messages that are time-division multiplexed over a set of multiple contiguous time resources, where a starting time resource of the set of multiple contiguous time resources is contiguous with the AGC resource, and where a first time period spanned by the AGC resource is greater than a second time period spanned by each PSFCH message of the set of multiple PSFCH messages.

Another apparatus for wireless communications is described. The apparatus may include means for transmitting a signal in an automatic gain control (AGC) resource and means for transmitting a first PSFCH message based on transmitting the signal in the AGC resource, where the first PSFCH message is one of a set of multiple PSFCH messages that are time-division multiplexed over a set of multiple contiguous time resources, where a starting time resource of the set of multiple contiguous time resources is contiguous with the AGC resource, and where a first time period spanned by the AGC resource is greater than a second time period spanned by each PSFCH message of the set of multiple PSFCH messages.

A non-transitory computer-readable medium storing code for wireless communications is described. The code may include instructions executable by a processor to transmit a signal in an automatic gain control (AGC) resource and transmit a first PSFCH message based on transmitting the signal in the AGC resource, where the first PSFCH message is one of a set of multiple PSFCH messages that are time-division multiplexed over a set of multiple contiguous time resources, where a starting time resource of the set of multiple contiguous time resources is contiguous with the AGC resource, and where a first time period spanned by the AGC resource is greater than a second time period spanned by each PSFCH message of the set of multiple PSFCH messages.

In some examples of the method, apparatus, and non-transitory computer-readable medium described herein, the AGC resource includes a set of multiple symbol sets, each symbol set of the set of multiple symbol sets maps to a respective time resource of the set of multiple contiguous time resources, and transmitting the first PSFCH message over a first time resource of the set of multiple contiguous time resources may be based on the first time resource mapping to a symbol set of the set of multiple symbol sets.

In some examples of the method, apparatus, and non-transitory computer-readable medium described herein, the AGC resource includes a set of multiple sets of contiguous resource blocks, each set of contiguous resource blocks maps to a respective time resource of the set of multiple contiguous time resources, and transmitting the first PSFCH message over a first time resource of the set of multiple contiguous time resources may be based on the first time resource mapping to a set of contiguous resource blocks of the set of multiple sets of contiguous resource blocks.

Some examples of the method, apparatus, and non-transitory computer-readable medium described herein may further include operations, features, means, or instructions for transmitting the signal may be based on a first frequency comb index of a set of multiple frequency comb indices, each frequency comb index of the set of multiple frequency comb indices maps to a respective time resource of the set of multiple contiguous time resources, and transmitting the first PSFCH message over a first time resource of the set of multiple contiguous time resources may be based on the first time resource mapping to the first frequency comb index of the set of multiple frequency comb indices.

Some examples of the method, apparatus, and non-transitory computer-readable medium described herein may further include operations, features, means, or instructions for transmitting the signal may be based on a first sequence index of a set of multiple sequence indices, each sequence index of the set of multiple sequence indices maps to a respective time resource of the set of multiple contiguous time resources, and transmitting the first PSFCH message over a first time resource of the set of multiple contiguous time resources may be based on the first time resource mapping to the first sequence index of the set of multiple sequence indices.

In some examples of the method, apparatus, and non-transitory computer-readable medium described herein, each sequence index of the set of multiple sequence indices includes a respective cyclic shift index.

In some examples of the method, apparatus, and non-transitory computer-readable medium described herein, the signal includes a reference signal associated with a Chu sequence or a pseudo-random sequence.

In some examples of the method, apparatus, and non-transitory computer-readable medium described herein, a first bandwidth spanned by the signal in the AGC resource may be greater than a second bandwidth spanned by the set of multiple PSFCH messages.

In some examples of the method, apparatus, and non-transitory computer-readable medium described herein, each time resource of the set of multiple contiguous time resources spans a duration of a symbol or a multiple of the duration of the symbol.

In some examples of the method, apparatus, and non-transitory computer-readable medium described herein, the AGC resource spans a first duration of a slot, a second duration of a set of multiple symbols, or both.

A method for wireless communications by an apparatus is described. The method may include transmitting a first signal in a first automatic gain control (AGC) resource, transmitting a first sidelink message over a first time resource contiguous with the first AGC resource, where the first sidelink message is associated with a control channel or a shared channel, receiving a second signal in a second AGC resource, receiving a physical sidelink feedback channel (PSFCH) message over a second time resource occurring after the second AGC resource based on a gain for reception of the PSFCH message, where the gain is based on receiving the second signal, and transmitting a second sidelink message over a third time resource based on transmitting the first signal in the first AGC resource, where the third time resource occurs after the second time resource, and where the second time resource occurs after the first time resource.

An apparatus for wireless communications is described. The apparatus may include one or more memories storing processor executable code, and one or more processors coupled with the one or more memories. The one or more processors may be operable to execute the code to cause the one or more processors, individually or collectively, to transmit a first signal in a first automatic gain control (AGC) resource, transmit a first sidelink message over a first time resource contiguous with the first AGC resource, where the first sidelink message is associated with a control channel or a shared channel, receive a second signal in a second AGC resource, receive a physical sidelink feedback channel (PSFCH) message over a second time resource occurring after the second AGC resource based on a gain for reception of the PSFCH message, where the gain is based on receiving the second signal, and transmit a second sidelink message over a third time resource based on transmitting the first signal in the first AGC resource, where the third time resource occurs after the second time resource, and where the second time resource occurs after the first time resource.

Another apparatus for wireless communications is described. The apparatus may include means for transmitting a first signal in a first automatic gain control (AGC) resource, means for transmitting a first sidelink message over a first time resource contiguous with the first AGC resource, where the first sidelink message is associated with a control channel or a shared channel, means for receiving a second signal in a second AGC resource, means for receiving a physical sidelink feedback channel (PSFCH) message over a second time resource occurring after the second AGC resource based on a gain for reception of the PSFCH message, where the gain is based on receiving the second signal, and means for transmitting a second sidelink message over a third time resource based on transmitting the first signal in the first AGC resource, where the third time resource occurs after the second time resource, and where the second time resource occurs after the first time resource.

A non-transitory computer-readable medium storing code for wireless communications is described. The code may include instructions executable by a processor to transmit a first signal in a first automatic gain control (AGC) resource, transmit a first sidelink message over a first time resource contiguous with the first AGC resource, where the first sidelink message is associated with a control channel or a shared channel, receive a second signal in a second AGC resource, receive a physical sidelink feedback channel (PSFCH) message over a second time resource occurring after the second AGC resource based on a gain for reception of the PSFCH message, where the gain is based on receiving the second signal, and transmit a second sidelink message over a third time resource based on transmitting the first signal in the first AGC resource, where the third time resource occurs after the second time resource, and where the second time resource occurs after the first time resource.

In some examples of the method, apparatus, and non-transitory computer-readable medium described herein, the second time resource may be contiguous with the second AGC resource.

In some examples of the method, apparatus, and non-transitory computer-readable medium described herein, the second time resource may be non-contiguous with the third time resource.

In some examples of the method, apparatus, and non-transitory computer-readable medium described herein, the second sidelink message may be associated with the control channel or the shared channel.

DETAILED DESCRIPTION

Figure 1:
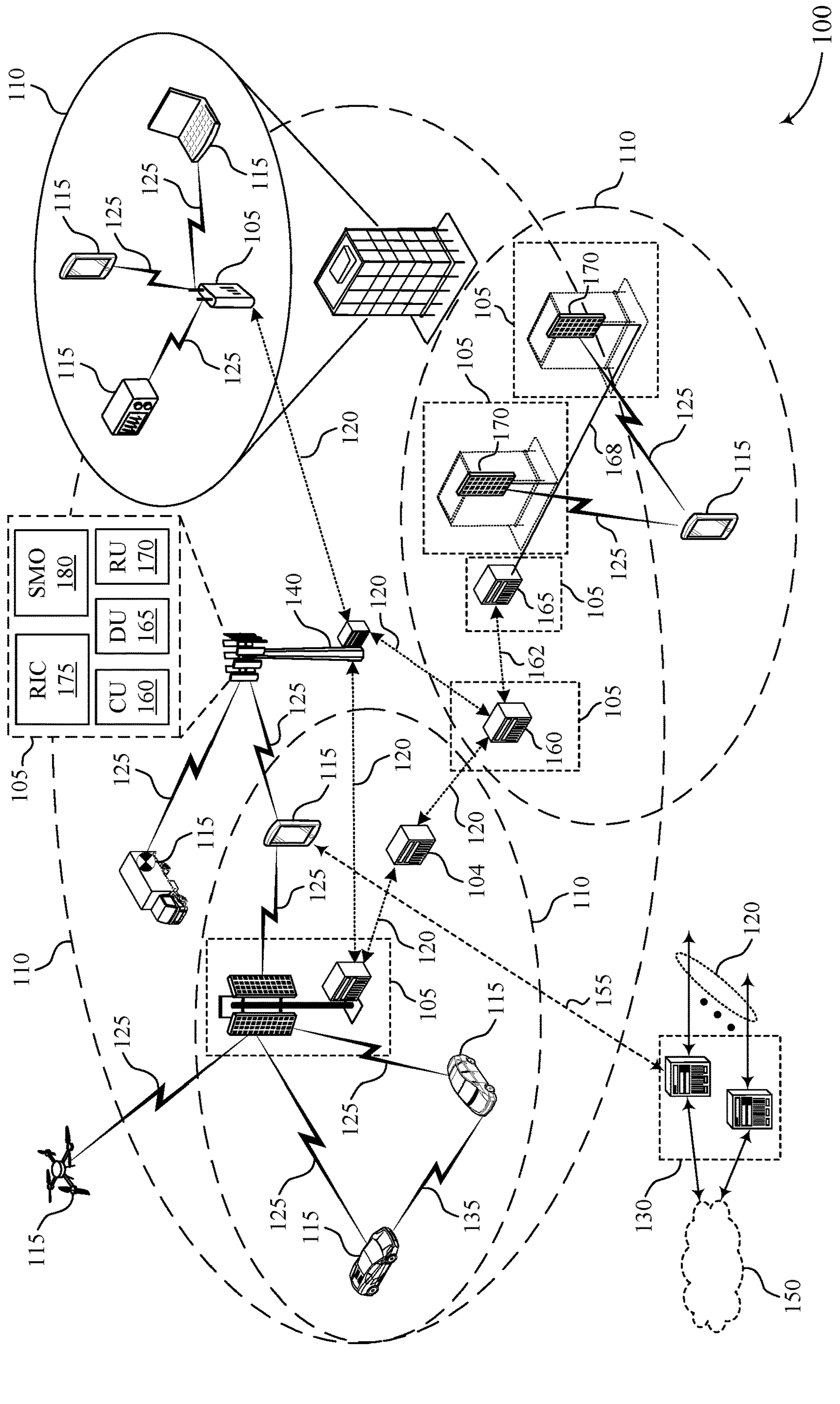
FIG. 1 shows an aspect of a wireless communications system that supports automatic gain control designs for sidelink feedback in accordance with one or more aspects of the present disclosure.

Prior to communicating sidelink transmissions, a user equipment (UE) may perform automatic gain control (AGC) training over an AGC resource. For instance, the UE may receive a signal in the AGC resource from a second UE and may use that signal to determine a gain used to receive a sidelink message from the second UE in a time resource following the AGC resource. The sidelink message may be a physical sidelink control channel (PSCCH) message, a physical sidelink shared channel (PSSCH) message, or a physical sidelink feedback channel (PSFCH) message. As a duration of the time resource for receiving the sidelink message decreases relative to a duration of the AGC resource, performing AGC for the sidelink message may become increasingly inefficient. For instance, a duration of a time resource for receiving a PSFCH message (e.g., one or two symbols) may be shorter than a duration of the AGC resource (e.g., a slot).

The present disclosure describes techniques to make more efficient use of resources in scenarios in which a duration of the time resource for receiving the sidelink message is reduced (e.g., less than a slot, smaller than a duration for performing AGC training). For instance, multiple sidelink transmissions may be time-division multiplexed (TDMed) over a set of contiguous time resources after an AGC resource. The AGC resource may be common to each of the PSFCH messages for determination of gain. Alternatively, the AGC resource may be configured such that each PSFCH message maps to a different parameter value associated with the AGC resource. For instance, the AGC resource may be divided into AGC symbol sets, where each AGC symbol set is used for determination of a gain for a respective PSFCH message. Alternatively, the AGC resource may be divided into multiple sets of contiguous resource blocks (RBs), where each RB is used for determination of a gain for a respective PSFCH message. Alternatively, the signal sent in the AGC resource may be configured such that each of multiple comb frequencies are used to determine a gain for a respective PSFCH message and/or such that each of multiple sequence indices (e.g., cyclic-shift indices) may be used to determine a gain for a respective PSFCH message. Configuring a single AGC resource for multiple TDMed PSFCH messages may increase the efficiency of wireless communications (e.g., as compared to having a separate AGC resource for each PSFCH message).

In other aspects, a first AGC resource may be contiguous with one or more PSSCH and/or PSCCH resources and a second AGC resource may be contiguous with a PSFCH resource, where the second AGC resource may occur after the one or more PSSCH and/or PSCCH resources. In some such aspects, a first gain may be determined for reception of PSSCH and/or PSCCH transmissions over the one or more PSSCH and/or PSCCH resources and a second gain may be determined for reception of the PSFCH message. To enable more efficient usage of resources after the second AGC resource, additional PSSCH and/or PSFCH resources may occur after the PSFCH resource that reuse the first gain. Additional AGC training may not be performed for these additional PSSCH and/or PSFCH resources and, thus, the efficiency of wireless communications may increase.

Aspects of the disclosure are initially described in the context of wireless communications systems. Additional aspects of the disclosure are described in the context of communication schemes. Aspects of the disclosure are further illustrated by and described with reference to apparatus diagrams, system diagrams, and flowcharts that relate to automatic gain control designs for sidelink feedback.

FIG. 1 shows an aspect of a wireless communications system 100 that supports automatic gain control designs for sidelink feedback in accordance with one or more aspects of the present disclosure. The wireless communications system 100 may include one or more network entities 105, one or more UEs 115, and a core network 130. In some aspects, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various aspects, a network entity 105 may be referred to as a network element, a mobility element, a radio access network (RAN) node, or network equipment, among other nomenclature. In some aspects, network entities 105 and UEs 115 may wirelessly communicate via one or more communication links 125 (e.g., a radio frequency (RF) access link). For instance, a network entity 105 may support a coverage area 110 (e.g., a geographic coverage area) over which the UEs 115 and the network entity 105 may establish one or more communication links 125. The coverage area 110 may be an aspect of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some aspect UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For instance, a node may be a UE 115. As another aspect, a node may be a network entity 105. As another aspect, a first node may be configured to communicate with a second node or a third node. In one aspect of this aspect, the first node may be a UE 115, the second node may be a network entity 105, and the third node may be a UE 115. In another aspect of this aspect, the first node may be a UE 115, the second node may be a network entity 105, and the third node may be a network entity 105. In yet other aspects of this aspect, the first, second, and third nodes may be different relative to these aspects. Similarly, reference to a UE 115, network entity 105, apparatus, device, computing system, or the like may include disclosure of the UE 115, network entity 105, apparatus, device, computing system, or the like being a node. For instance, disclosure that a UE 115 is configured to receive information from a network entity 105 also discloses that a first node is configured to receive information from a second node.

In some aspects, network entities 105 may communicate with the core network 130, or with one another, or both. For instance, network entities 105 may communicate with the core network 130 via one or more backhaul communication links 120 (e.g., in accordance with an S1, N2, N3, or other interface protocol). In some aspects, network entities 105 may communicate with one another via a backhaul communication link 120 (e.g., in accordance with an X2, Xn, or other interface protocol) either directly (e.g., directly between network entities 105) or indirectly (e.g., via a core network 130). In some aspects, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other aspects or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some aspects, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some aspects, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For instance, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some aspects, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For instance, a functional split of a protocol stack may be employed between a CU 160 and a DU 165 such that the CU 160 may support one or more layers of the protocol stack and the DU 165 may support one or more different layers of the protocol stack. In some aspects, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some aspects, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some aspects, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an aspect of a portion of backhaul link, and may communicate with other CUs 160 (e.g., a CU 160 associated with an alternative IAB donor) via an Xn-C interface, which may be an aspect of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For instance, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For instance, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support automatic gain control designs for sidelink feedback as described herein. For instance, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other aspects. A UE 115 may also include or may be referred to as a personal electronic device such as a cellular phone, a personal digital assistant (PDA), a tablet computer, a laptop computer, or a personal computer. In some aspects, a UE 115 may include or be referred to as a wireless local loop (WLL) station, an Internet of Things (IoT) device, an Internet of Everything (IoE) device, or a machine type communications (MTC) device, among other aspects, which may be implemented in various objects such as appliances, or vehicles, meters, among other aspects.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other aspects, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For instance, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For instance, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some aspects, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, In some aspects, the carrier bandwidth may be referred to as a "system bandwidth" of the carrier or the wireless communications system 100. For instance, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some aspects, the wireless communications system 100 may include network entities 105 or UEs 115 that support concurrent communications using carriers associated with multiple carrier bandwidths. In some aspects, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some aspects, a UE 115 may be configured with multiple BWPs. In some aspects, a single BWP for a carrier may be active at a given time and communications for the UE 115 may be restricted to one or more active BWPs.

The time intervals for the network entities 105 or the UEs 115 may be expressed in multiples of a basic time unit which may, For instance, refer to a sampling period of $T_s=1/(\Delta f_{max}\cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some aspects, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some aspects, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, For instance, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For instance, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, For instance a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some aspects, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For instance, a cell may be or include a building, a subset of a building, or exterior spaces between or overlapping with coverage areas 110, among other aspects.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some aspects, a carrier may support multiple cells, and different cells may be configured according to different protocol types (e.g., MTC, narrowband IoT (NB-IoT), enhanced mobile broadband (eMBB)) that may provide access for different types of devices.

In some aspects, a network entity 105 (e.g., a base station 140, an RU 170) may be movable and therefore provide communication coverage for a moving coverage area 110. In some aspects, different coverage areas 110 associated with different technologies may overlap, but the different coverage areas 110 may be supported by the same network entity 105. In some other aspects, the overlapping coverage areas 110 associated with different technologies may be supported by different network entities 105. The wireless communications system 100 may include, For instance, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, In some aspects, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some aspects, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Aspects of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some aspects, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For instance, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For instance, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some aspects, a UE 115 may be configured to support communicating directly with other UEs 115 via a device-to-device (D2D) communication link 135 (e.g., in accordance with a peer-to-peer (P2P), D2D, or sidelink protocol). In some aspects, one or more UEs 115 of a group that are performing D2D communications may be within the coverage area 110 of a network entity 105 (e.g., a base station 140, an RU 170), which may support aspects of such D2D communications being configured by (e.g., scheduled by)

the network entity 105. In some aspects, one or more UEs 115 of such a group may be outside the coverage area 110 of a network entity 105 or may be otherwise unable to or not configured to receive transmissions from a network entity 105. In some aspects, groups of the UEs 115 communicating via D2D communications may support a one-to-many (1:M) system in which each UE 115 transmits to each of the other UEs 115 in the group. In some aspects, a network entity 105 may facilitate the scheduling of resources for D2D communications. In some other aspects, D2D communications may be carried out between the UEs 115 without an involvement of a network entity 105.

In some systems, a D2D communication link 135 may be an aspect of a communication channel, such as a sidelink communication channel, between vehicles (e.g., UEs 115). In some aspects, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some aspects, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some aspects, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some aspects, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For instance, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some aspects, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other aspects.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For instance, one or more base station antennas or antenna arrays may be co-located at an antenna assembly, such as an antenna tower. In some aspects, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, For instance, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For instance, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For instance, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some aspects, the beam direction associated with transmissions along a single beam direction may be determined based on a signal that was transmitted along one or more beam directions. For instance, a UE 115 may receive one or more of the signals transmitted by the network entity 105 along different directions and may report to the network entity 105 an indication of the signal that the UE 115 received with a highest signal quality or an otherwise acceptable signal quality.

In some aspects, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a transmitting device (e.g., a network entity 105), such as synchronization signals, reference signals, beam selection signals, or other control signals. For instance, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some aspects, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some aspects, a device may support same-slot HARQ feedback, in which case the device may provide HARQ feedback in a specific slot for data received via a previous symbol in the slot. In some other aspects, the device may provide HARQ feedback in a subsequent slot, or according to some other time interval.

Prior to communicating sidelink transmissions, a UE 115 may perform AGC training over an AGC resource. For instance, the UE 115 may receive a signal in the AGC resource from a second UE 115 and may use that signal to determine a gain used to receive a sidelink message from the second UE 115 in a time resource following the AGC resource. The sidelink message may be a PSCCH message, a PSSCH message, or a PSFCH message. As a duration of the time resource for receiving the sidelink message decreases relative to a duration of the AGC resource, performing AGC for the sidelink message may become increasingly inefficient. For instance, a duration of a time resource for receiving a PSFCH message (e.g., one or two symbols) may be shorter than a duration of the AGC resource (e.g., a slot).

The present disclosure describes techniques to make more efficient use of resources in scenarios in which a duration of the time resource for receiving the sidelink message is reduced (e.g., less than one slot, smaller than a duration for performing AGC training). For instance, multiple sidelink transmissions may be TDMed over a set of contiguous time resources after an AGC resource. The AGC resource may be common to each of the PSFCH messages for determination of gain. Alternatively, the AGC resource may be configured such that each PSFCH message maps to a different parameter value associated with the AGC resource. For instance, the AGC resource may be divided into AGC symbol sets, where each AGC symbol set is used for determination of a gain for a respective PSFCH message. Alternatively, the AGC resource may be divided into multiple sets of contiguous RBs, where each RB is used for determination of a gain for a respective PSFCH message. Alternatively, the signal sent in the AGC resource may be configured such that each of multiple comb frequencies are used to determine a gain for a respective PSFCH message and/or such that each of multiple sequence indices (e.g., cyclic-shift indices) may be used to determine a gain for a respective PSFCH message. Configuring a single AGC resource for multiple TDMed PSFCH messages may increase the efficiency of wireless communications (e.g., as compared to having a separate AGC resource for each PSFCH message).

In other aspects, a first AGC resource may be contiguous with one or more PSSCH and/or PSCCH resources and a second AGC resource may be contiguous with a PSFCH resource, where the second AGC resource may occur after the one or more PSSCH and/or PSCCH resources. In some such aspects, a first gain may be determined for reception of PSSCH and/or PSCCH transmissions over the one or more PSSCH and/or PSCCH resources and a second gain may be determined for reception of the PSFCH message. To enable more efficient usage of resources after the second AGC resource, additional PSSCH and/or PSFCH resources may occur after the PSFCH resource that reuses the first gain. Additional AGC training may not be performed for these additional PSSCH and/or PSFCH resources and, thus, the efficiency of wireless communications may increase.

Figure 2A:
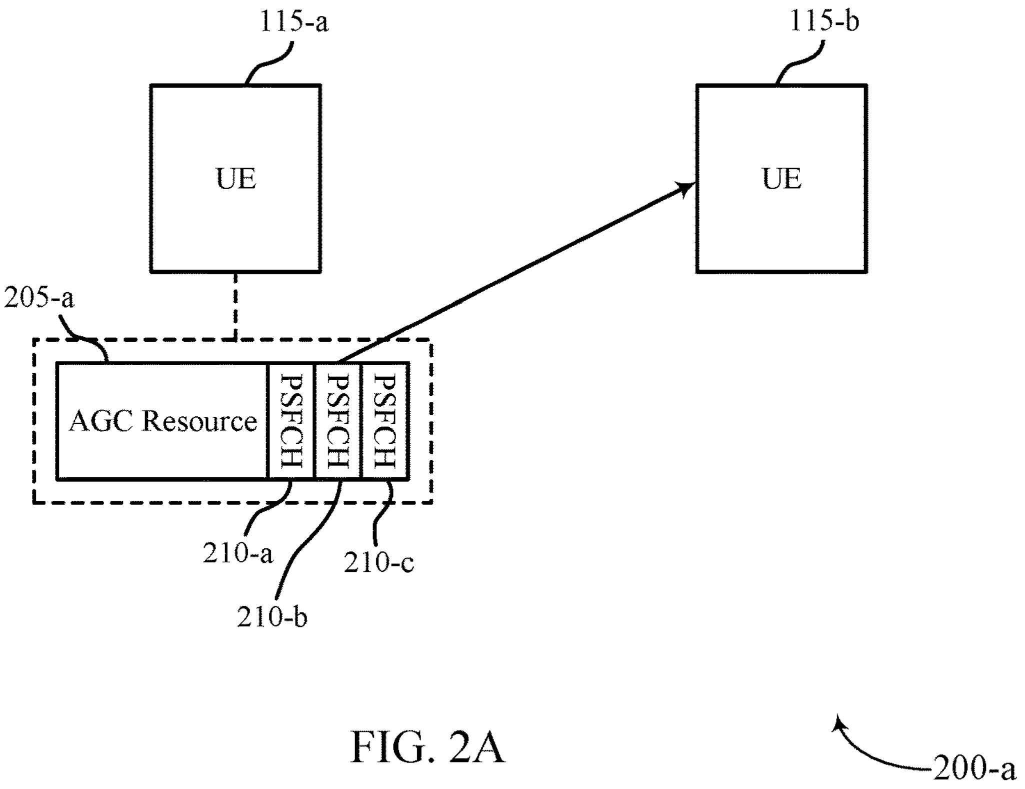
FIGS. 2A and 2B show aspects of wireless communications systems that support automatic gain control designs for sidelink feedback in accordance with one or more aspects of the present disclosure.
Figure 2B:
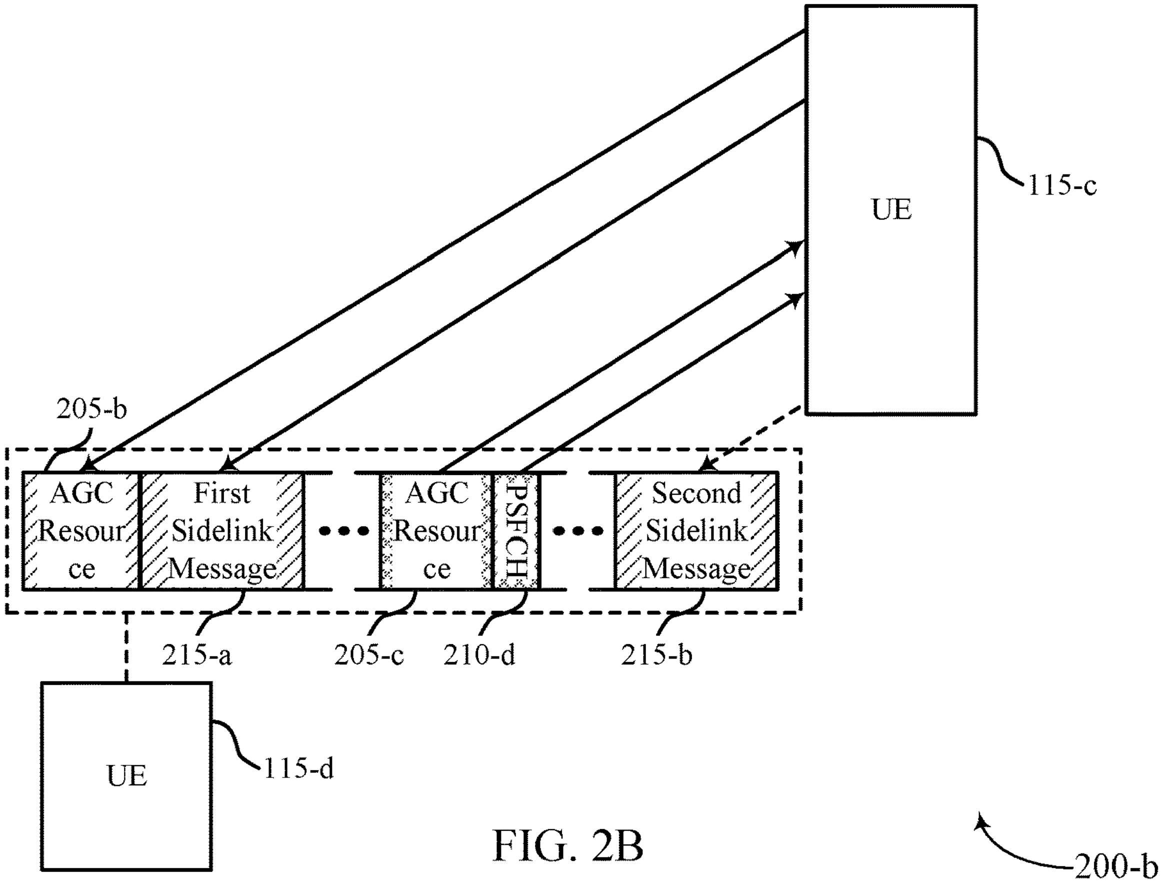

FIGS. 2A and 2B show aspects of wireless communications systems 200-*a* and 200-*b* that support automatic gain control designs for sidelink feedback in accordance with one or more aspects of the present disclosure. In some aspects, wireless communications systems 200- and 200-*b* may implement one or more aspects of FIG. 1. For instance, UEs 115-*a*, 115-*b*, 115-*c*, and 115-*d* may each be an aspect of a UE 115 as described with reference to FIG. 1.

In some aspects, multiple time resources for transmitting a respective PSFCH message may be multiplexed together following an AGC resource. For instance, as depicted in FIG. 2A, UE 115-*a* may transmit a signal in AGC resource 205-*a* and a PSFCH message in PSFCH resource 210-*b*, where AGC resource 205-*a* may be contiguous with a set of PSFCH resources (e.g., PSFCH resources 210-*a*, 210-*b*, and 210-*c*). The set of PSFCH resources may be associated with a respective set of TDMed time resources. For instance, AGC resource 205-*a* may be contiguous with a starting PSFCH resource (e.g., PSFCH resource 210-*a*) of the set of PSFCH resources. Each PSFCH resource may correspond to a respective PSFCH message opportunity. For instance, PSFCH resource 210-*a* may carry a first PSFCH message (e.g., may be an opportunity associated with a PSFCH for a different UE); PSFCH resource 210-*b* may carry a second PSFCH message (e.g., the PSFCH message from UE 115-*a*); and PSFCH resource 210-*c* may carry a third PSFCH message (e.g., may be an opportunity associated with a PSFCH for a different UE). After receiving the signal in AGC resource 205-*a*, UE 115-*b* may determine a gain for reception of the second PSFCH message and UE 115-*b* may receive the second PSFCH message in PSFCH resource 210-*b* using the determined gain. AGC resource 205-*a* may span one or more slots.

The time resources associated with the set of PSFCH resources may be contiguous in time with each other. For instance, PSFCH resource 210-*a* may be contiguous in time with PSFCH resource 210-*b*, and PSFCH resource 210-*b* may be contiguous in time with PSFCH resource 210-*c*. In some aspects, any of the first, second, or third PSFCH messages may be associated with a different link than another PSFCH message carried by the TDMed time resources of the PSFCH resources. For instance, the second message carried in PSFCH resource 210-*b* may be transmitted by UE 115-*a* and received by UE 115-*b*. However, the first or third messages in PSFCH resources 210-*a* or 210-*c*, respectively, may be transmitted by another UE 115 and/or received by another UE 115 distinct from UEs 115-*a* and 115-*b*. In some aspects, each PSFCH resource (e.g., of PSFCH resources 210-*a*, 210-*b*, and 210-*c*) may span a symbol or a multiple of a symbol (e.g., 2 symbols). In some aspects, a quantity of PSFCH resources may be based on a subcarrier spacing. For instance, if the subcarrier spacing is equal to 120 kHz, there may be 9 PSFCH resources each carrying a respective PSFCH message. Alternatively, if the subcarrier spacing is equal to 480 kHz, there may be 10 PSFCH resources each carrying a respective PSFCH message with one or more gap resources (e.g., gap symbols) following the 10 PSFCH resources (e.g., 4 gap symbols). Alternatively, if the subcarrier spacing is 960 kHz, there may be 6 time resources each carrying a respective PSFCH message with one or more gap resources (e.g., gap symbols) following the 6 PSFCH resources (e.g., 8 gap symbols). Additional details may be described herein, for instance, with reference to FIGS. 4A through 4C.

In some aspects (e.g., to reduce an overhead associated with AGC resource 205-*a*), the PSFCH resources may share AGC resource 205-*a*. For instance, the PSFCH resources (e.g., in a PSFCH slot) may share common AGC symbols and/or slots of AGC resource 205-*a* for a receiver UE to train its AGC setting. Each transmitting UE may transmit PSFCH messages within respective PSFCH resources and may transmit an AGC waveform in the common AGC symbols and/or slots (e.g., within AGC resource 205-*a*).

In some aspects, the signal received in AGC resource 205-*a* may be a repetition of a PSFCH waveform to be transmitted in one or more of PSFCH resources 210-*a*, 210-*b*, and 210-*c*. The PSFCH waveform may be repeated within each symbol of AGC resource 205-*a*. In some aspects, a receiving UE (e.g., UE 115-*b*) may estimate an expected receive power of PSFCH time resources (e.g., PSFCH symbols) using AGC resource 205-*a*. However, as multiple UEs may be transmitting PSFCH in different symbols but may also transmit a signal in shared AGC resource 205-*a*, the receiving UE may over-estimate the receive power leading to too conservative of an AGC setting (e.g., leading to a gain too low to receive and successfully decode a PSFCH from one of the transmitting UEs). For instance, UE 115-*b* may receive signals from UE 115-*a* and another UE 115 in AGC resource 205-*a* and may determine a gain based on a combined power of the signals. However, UE 115-*a* and the other UE 115 may transmit their respective PSFCH messages in separate PSFCH resources that do not overlap. Thus, UE 115-*b* may determine a gain too low to receive the PSFCH messages.

In order to mitigate an amount by which UE 115-*b* overestimates the receiving power, the signal received in AGC resource 205-*a* may be a reference signal-based waveform. The reference signal may be derived from a Chu sequence or a pseudo-random sequence (e.g., gold sequence, m-sequence). Additionally, the sequence length may be configured or pre-configured and may occupy frequency resources in AGC resource 205-*a* in a resource pool or sidelink bandwidth part. Using the reference signal-based waveform may reduce a likelihood that UE 115-*b* overestimates a receive and/or the gain for reception.

In some aspects, the signal carried by AGC resource 205-*a* may span a first bandwidth that is greater than a second bandwidth spanned by the PSFCH messages carried in PSFCH resources 210-*a*, 210-*b*, and 210-*c* (e.g., a configured bandwidth for AGC resource 205-*a* may be larger than that of a configured bandwidth for transmission of PSFCH in PSFCH resources 210-*a*, 210-*b*, and 210-*c*). For instance, a bandwidth of the AGC waveform may be larger than the PSFCH waveform. Increasing the bandwidth of AGC resource 205-*a* relative to PSFCH waveforms in PSFCH resources 210-*a*, 210-*b*, and 210-*c* may improve (e.g., decrease) AGC loop convergence time and may enable UE 115-*b* to determine the gain more quickly (e.g., fewer symbols may be used in AGC resource 205-*a* as a result). When the signal is carried in an AGC resource 205-*a* that spans the first bandwidth greater than the second bandwidth and is reference signal-based, the signal may be referred to as a wideband reference signal-based AGC waveform. Additional details associated with wideband AGC waveforms may be described herein, for instance, with reference to FIG. 5A.

In some aspects, the wideband reference signal-based AGC waveform may be mapped to a set of contiguous AGC symbol sets within AGC resource 205-*a*. For instance, multiple AGC symbol sets may be TDMed together and each PSFCH message may be associated with a respective AGC symbol set of the multiple AGC symbol sets. Using the wideband reference signal-based AGC waveform may reduce an AGC convergence time to N symbols. Thus, each symbol set of the multiple symbol sets may include N contiguous symbols. As described herein, each AGC symbol set may be associated with a PSFCH transmission, and a UE 115 transmitting PSFCH may transmit an AGC signal in an associated AGC symbol set before PSFCH transmission. For instance, a UE 115 may transmit a first signal within a first symbol set of AGC resource 205-*a*, where the first signal may be used to determine a gain for receiving the first PSFCH message transmitted over PSFCH resource 210-*a* and UE 115-*a* may transmit a second signal within a second symbol set of AGC resource 205-*a*, where the second signal may be used (e.g., by UE 115-*b*) to determine a gain for receiving the second PSFCH message transmitted over PSFCH resource 210-*b*. In some aspects, a PSFCH receiving UE (e.g., UE 115-*b*) may estimate a PSFCH receiving power and an interference power (e.g., from other sidelink messages, such as a PSFCH message, a PSCCH message, a PSSCH message) of target PSFCH time resources (e.g., PSFCH resource 210-*b*) from an associated symbol set (e.g., a symbol set that maps to PSFCH resource 210-*b*). Additional details associated with AGC symbol sets may be described herein, for instance, with reference to FIG. 5B.

In some aspects, reference signal-based AGC waveforms may be mapped to different frequency resources to generate different frequency-division multiplexing (FDM) AGC waveforms, and different PSFCH message opportunities may be associated with different FDM AGC resources. For instance, each UE transmitting an AGC waveform may transmit the AGC waveform with a different comb index, where each comb index may be associated with a respective PSFCH resource. In an aspect, a UE 115 may transmit a first signal with a first comb index of a set of comb indices, where the first signal may be used to determine a gain for receiving the first PSFCH message transmitted over PSFCH resource 210-*a*, and UE 115-*a* may transmit a second signal with a second comb index of the set of comb indices, where the second signal may be used (e.g., by UE 115-*b*) to determine a gain for receiving the second PSFCH message. In some aspects, the receiving UE (e.g., UE 115-*b*) may estimate a receive power of a time resource by computing a received signal strength indicator (RSSI) or receive power of the respective comb based AGC signal from frequency domain comb indices associated with target PSFCH resources (e.g., PSFCH resource 210-*b*) in AGC resource 205-*a*. Using the comb index, the receiving UE may be capable of capturing PSCCH and/or PSSCH interference overlapping with the time resources, as an AGC waveform associated with PSCCH and/or PSSCHs may occupy each comb. Additional details may be described herein, for instance, with reference to FIG. 6A.

Additionally, or alternatively, each UE transmitting an AGC waveform may transmit the AGC waveform in a different set of contiguous RBs of AGC resource 205-*a*. For instance, a UE 115 may transmit a first signal in a first set of contiguous RBs within AGC resource 205-*a*, where the first signal may be used to determine a gain for receiving the first PSFCH message transmitted over PSFCH resource 210-*a*, and UE 115-*a* may transmit a second signal in a second set of contiguous RBs within AGC resource 205-*a*, where the second signal may be used (e.g., by UE 115-*b*) to determine a gain for receiving the second PSFCH message. In some aspects, the receiving UE (e.g., UE 115-*b*) may estimate a receive power of a PSFCH resource (e.g., PSFCH resource 210-*a*) from the associated set of contiguous RBs (e.g., from a set of contiguous RBs that maps to PSFCH resource 210-*a*). Additional details may be described herein, for instance, with reference to FIG. 6B.

In some aspects, each PSFCH resource associated with a PSFCH may be associated with a respective AGC waveform with a different sequence (e.g., a different cyclic shift) or a different pair of comb indices and sequence indices. For instance, each UE transmitting an AGC waveform may transmit the AGC waveform with a different cyclic shift (e.g., to generate orthogonal waveforms) or a different comb and cyclic shift pair. In an aspect, a UE 115 may transmit a first signal with a first cyclic shift index or a first comb and cyclic shift pair, where the first signal may be used to determine a gain for receiving the first PSFCH message transmitted over PSFCH resource 210-*a*, and UE 115-*a* may transmit a second signal with a second cyclic shift index or a second comb and cyclic shift pair, where the second signal may be used (e.g., by UE 115-*b*) to determine a gain for receiving the second PSFCH message transmitted over PSFCH resource 210-*b* In some aspects, the receiving UE (e.g., UE 115-*b*) may estimate the receive power for its target PSFCH resource (e.g., PSFCH resource 210-*b*) by computing the RSRP of the AGC reference signal associated with the target time resource from AGC resource 205-*a* (e.g., the signal associated with the cyclic shift or the comb and cyclic shift pair that maps to PSFCH resource 210-*b*). For instance, reference signal receive power (RSRP) may be computed based on a correlation with an AGC sequence in the associated comb. The receiving UE may use the estimated RSRP to adjust the AGC-associated gain. In some aspects, the receiving UE may estimate the target PSFCH receive power by computing the total RSSI from AGC symbols subtracted by receive power from other TDMed PSFCH resources (e.g., by computing the RSRP of AGC waveforms associated with the rest of the PSFCH resources other than PSFCH resource 210-*b*).

In FIG. 2B, UE 115-*c* may transmit a first signal in AGC resource 205-*b*. UE 115-*d* may receive the first signal and may determine a first gain for reception of a first sidelink message. UE 115-*c* may transmit the first sidelink message over resource 215-*a* and UE 115-*d* may receive the first sidelink message using the first gain. In some aspects, the resource 215-*a* for receiving the first sidelink message may be contiguous with AGC resource 205-*b*.

UE 115-*d* may transmit a second signal in AGC resource 205-*c*. UE 115-*c* may receive the second signal and may determine a second gain for reception of a PSFCH. UE 115-*d* may transmit the PSFCH message over PSFCH resource 210-*d* and UE 115-*d* may receive the PSFCH message using the second gain. In some aspects, PSFCH resource 210-*d* may be contiguous with AGC resource 205-*c*.

After PSFCH resource 210-*d*, a second sidelink message (e.g., a PSSCH or PSCCH message) may be transmitted over resource 215-*b*. For instance, UE 115-*c* or another UE 115 may transmit the second sidelink message. UE 115-*d* or another UE 115 may receive the second sidelink message. If UE 115-*d* is receiving the second sidelink message, UE 115-*d* may receive the second sidelink message using the first gain determined from the first signal in AGC resource 205-*b*. If another UE is receiving the second sidelink message, the other UE 115 may use a previously determined gain (e.g., a gain determined from a signal received in an AGC resource before AGC resource 205-*c*). In some aspects, resource 215-*b* may be non-contiguous with PSFCH resource 210-*d* (e.g., a communication gap may be present between resource 215-*b* and PSFCH resource 210-*d*). Both PSFCH resource 210-*d* and resource 215-*b* may occur within an AGC period associated with AGC resource 205-*c*. Additional details may be described herein, for instance, with reference to FIG. 7.

The techniques described herein may have one or more advantages. For instance, multiplexing multiple time resources for carrying PSFCH messages following a single AGC resource may be more resource efficient than using a separate AGC resource for each time resource. Additionally, or alternatively, transmitting PSSCH and/or PSCCH messages within an AGC period associated with a PSFCH message may be more resource efficient than performing additional AGC training over an additional AGC resource for the additional PSSCH and/or PSCCH messages.

Figure 3A:
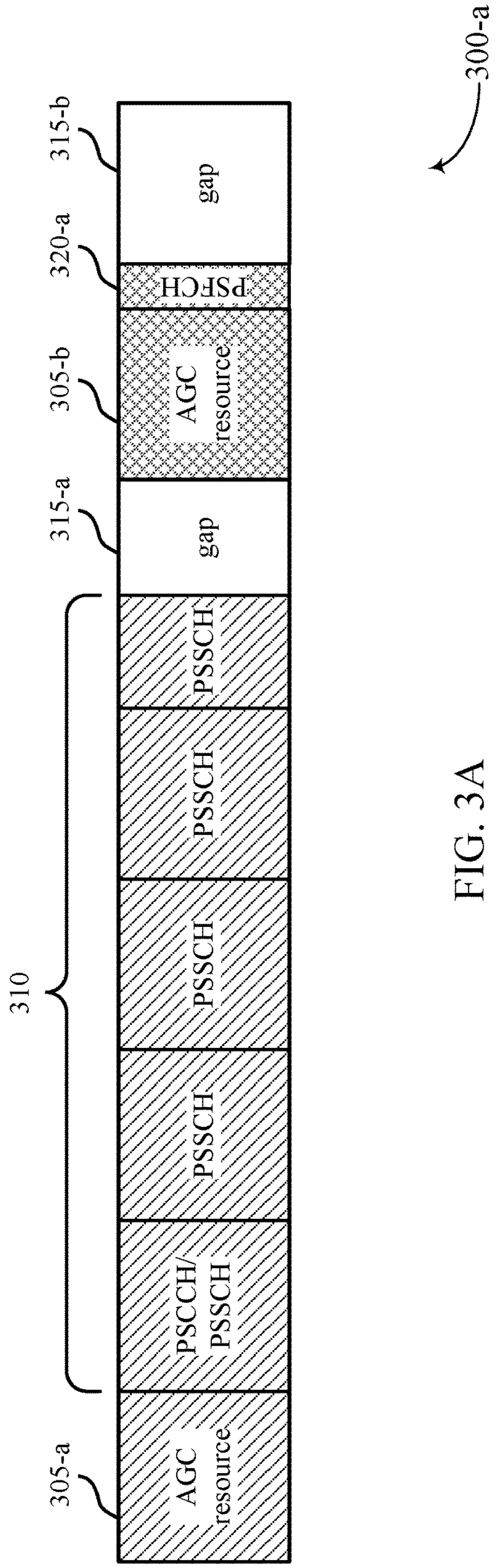
FIGS. 3A and 3B show aspects of communication schemes that support automatic gain control designs for sidelink feedback in accordance with one or more aspects of the present disclosure.
Figure 3B:
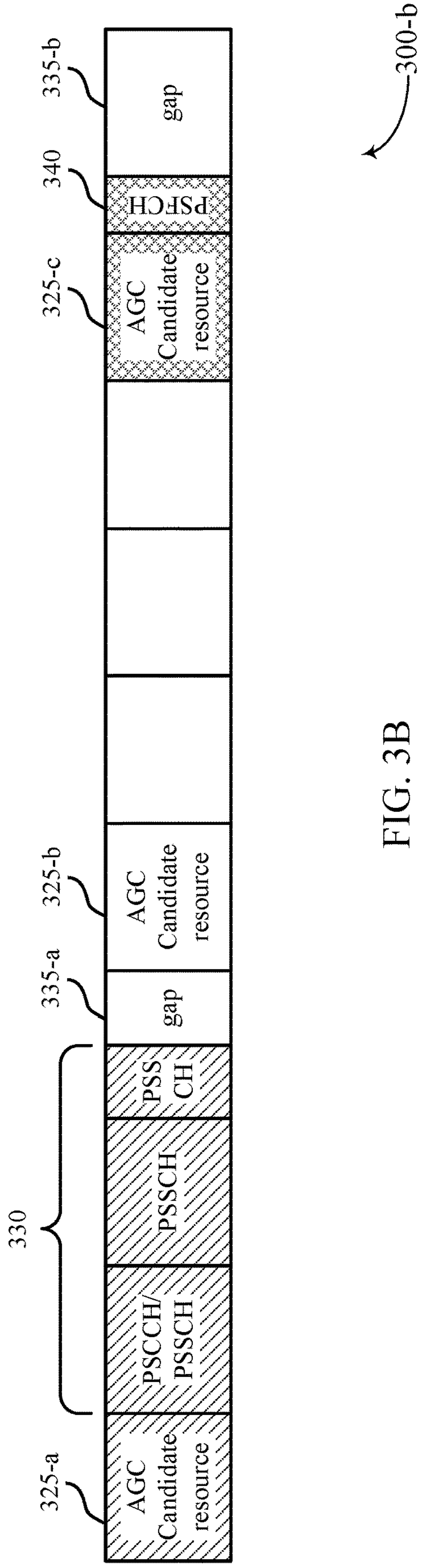

FIGS. 3A and 3B show aspects of communication schemes 300-*a* and 300-*b* that support automatic gain control designs for sidelink feedback in accordance with one or more aspects of the present disclosure. In some aspects, communication schemes 300-*a* and 300-*b* may represent aspects of AGC resources being used for reception of sidelink messages (e.g., PSCCH messages, PSSCH messages, PSFCH messages). In some aspects, communication schemes 300-*a* or 300-*b* may implement one or more aspects of wireless communications systems 200-*a* and/or 200-*b*. For instance, AGC candidate resource 325-*a* may be an aspect of AGC resource 205-*b* as described with reference to FIG. 2B; a sidelink resource of the set of sidelink resources 330 may be an aspect of resource 215-*a* as described with reference to FIG. 2B; AGC resource 305-*b* or AGC candidate resource 325-*c* may be an aspect of AGC resource 205-*a* as described with reference to FIG. 2A or AGC resource 205-*c* as described with reference to FIG. 2B; PSFCH resource 320-*a* or PSFCH resource 340 may be an aspect of PSFCH resource 210-*a* as described with reference to FIG. 2A or PSFCH resource 210-*d* as described with reference to FIG. 2B.

In communication scheme 300-*a*, an AGC resource 305-*a* may be scheduled that may be used for AGC training. The AGC resource 305-*a* may be contiguous with a set of sidelink resources 310 used for communicating PSCCH and/or PSSCH messages. In some aspects, receiving the PSCCH and/or PSSCH messages in the set of sidelink resources may be based on the AGC training performed in AGC resource 305-*a*.

A gap 315-*a* may occur between the set of sidelink resources 310 and AGC resource 305-*b*. AGC resource 305-*b* may be used for AGC training for receiving a PSFCH message over PSFCH resource 320-*a*, where PSFCH resource 320-*a* may be contiguous with AGC resource 305-*b*. According to various aspects, AGC resource 305-*b* may include multiplexed (e.g., FDM, TDM, frequency comb, cyclic shift) AGC resources, and PSFCH resource 320-*a* may include multiple PSFCH resources, as described with reference to FIG. 2A. In some aspects, a gap 315-*b* may occur following PSFCH resource 320-*a*. In some aspects, the sum of time spanned by AGC resource 305-*a*, the set of sidelink resource 310, gap 315-*a*, AGC resource 305-*b*, PSFCH resource 320-*a*, and gap 315-*b* may be referred to as a super-slot.

In communication scheme 300-*b*, an AGC candidate resource 325-*a* may be scheduled that may be used for AGC training. The AGC candidate resource 325-*a* may be contiguous with a set of sidelink resources 330 for communicating PSCCH and/or PSSCH messages. In some aspects, receiving the PSCCH and/or PSSCH messages in the set of sidelink resources may be based on the AGC training performed in AGC resource 305-*a* (e.g., based on a gain determined from a signal received in AGC candidate resource 325-*a*).

A gap 335-*a* may occur between the set of sidelink resources 330 and AGC candidate resource 325-*b*. In the present aspects, AGC candidate resource 325-*b* may not be utilized for AGC training (e.g., no sidelink messages may be scheduled in the resources immediately following AGC candidate resource 325-*b*. During AGC candidate resource 325-*c*, which may occur following AGC candidate resource 325-*b*, AGC training for receiving a PSFCH message over PSFCH resource 340 may be performed. According to various aspects, AGC candidate resource 325-*c* may include multiplexed (e.g., FDM, TDM, frequency comb, cyclic shift) AGC resources, and PSFCH resource 340 may include multiple PSFCH resources, as described with reference to FIG. 2A. In some aspects, a gap 335-*b* may occur following PSFCH resource 340. In some aspects, the sum of AGC candidate resource 325-*a*, the set of sidelink resources 330, gap 335-*a*, AGC candidate resource 325-*b*, the resources between AGC candidate resources 325-*b* and AGC candidate resources 325-*c*, PSFCH resource 340 and gap 335-*b* may represent a dynamic slot structure.

In some aspects, the techniques described herein may enable gaps 315-*b* and 335-*b* to be reduced. For instance, multiplexing multiple PSFCH resources (e.g., with PSFCH resource 320-*a* or PSFCH resource 340) may reduce a size of gap 315-*b* or gap 335-*b*. Similarly, including additional sidelink resources for communicating PSCCH and/or PSSCH messages in gap 315-*b* or gap 335-*b* may reduce the size of gap 315-*b* or gap 335-*b*. Reducing the size of gap 315-*b* or gap 335-*b* may increase the efficiency of wireless communications, as more information may be communicated within a same duration.

Figure 4A:
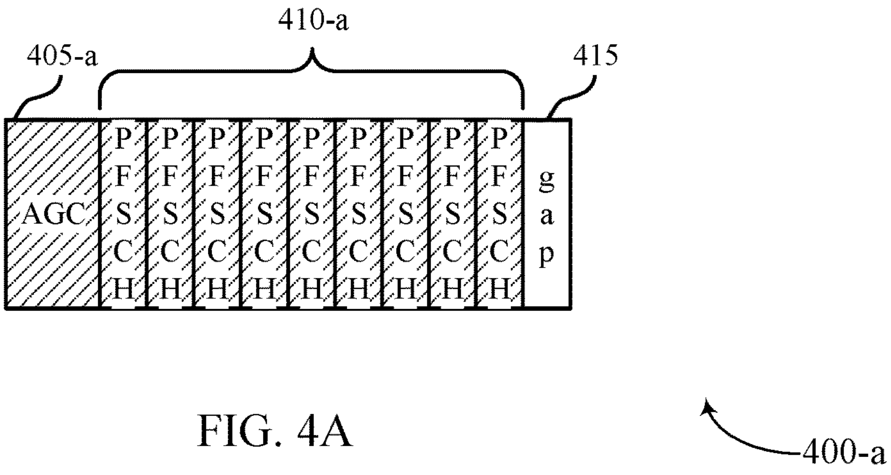
FIGS. 4A, 4B, and 4C show aspects of communication schemes that support automatic gain control designs for sidelink feedback in accordance with one or more aspects of the present disclosure.
Figure 4B:
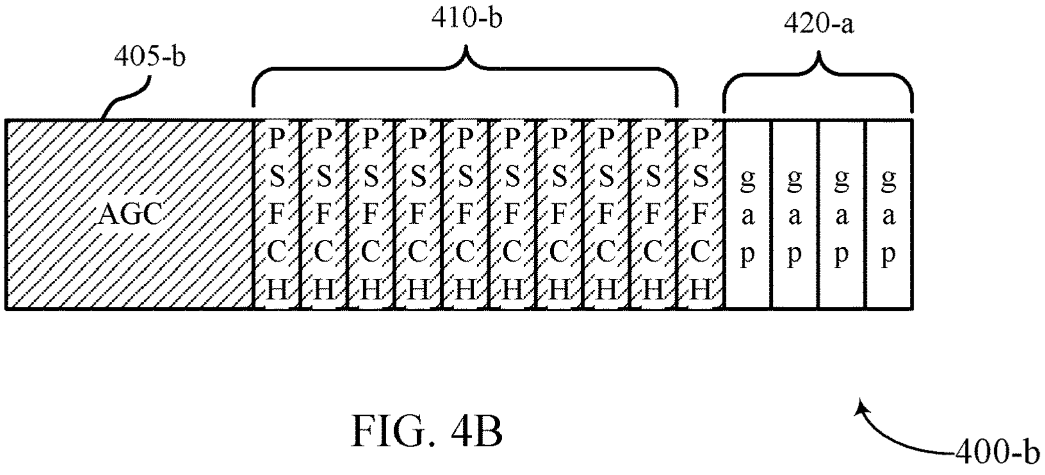
Figure 4C:
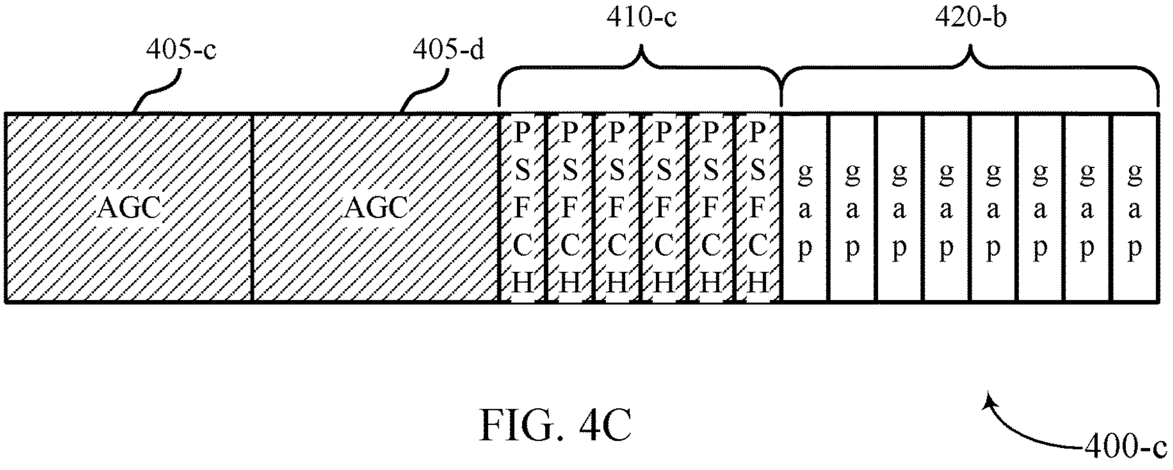

FIGS. 4A, 4B, and 4C show aspects of communication schemes 400-*a*, 400-*b*, and 400-*c* that support automatic gain control designs for sidelink feedback in accordance with one or more aspects of the present disclosure. In some aspects, communication schemes 400-*a*, 400-*b*, and/or 400-*c* may implement one or more aspects of wireless communications systems 200-*a*. For instance, AGC resources 405-*a*, 405-*b*, 405-*c*, and 405-*d* may each be an aspect of an AGC resource 205-*a* as described with reference to FIG. 2A; sets of PSFCH resources 410-*a*, 410-*b*, and 410-*c* may include PSFCH resources that may be an aspect of one or more of PSFCH resources 210-*a*, 210-*b*, or 210-*c* as described with reference to FIG. 2A; or both.

In communication scheme 400-*a*, an AGC resource 405-*a* used for AGC training may be scheduled. The AGC resource 405-*a* may be contiguous with a set of PSFCH resources 410-*a* used for communicating PSFCH messages. In some aspects, receiving the PSFCH messages in the set of PSFCH resources 410-*a* may be based on the AGC training performed in AGC resource 405-*a*. After a last PSFCH resource of PSFCH resources 410-*a*, a gap 415 (e.g., 1-symbol gap) may occur. In some aspects, communication scheme 400-*a* may be employed when a subcarrier spacing is equal to 120 kHz.

In communication scheme 400-*b*, an AGC resource 405-*b* used for AGC training may be scheduled. The AGC resource 405-*b* may be contiguous with a set of PSFCH resources 410-*b* used for communicating PSFCH messages. In some aspects, receiving the PSFCH messages in the set of PSFCH resources 410-*b* may be based on the AGC training performed in AGC resource 405-*b*. After a last PSFCH resource of PSFCH resources 410-*b*, a set of contiguous gap resources 420-*a* may occur. In some aspects, communication scheme 400-*b* may be employed when a subcarrier spacing is equal to 480 kHz.

In communication scheme 400-*c*, AGC resources 405-*c* and 405-*d* used for AGC training may be scheduled. The AGC resource 405-*d* may be contiguous with a set of PSFCH resources 410-*c* used for communicating PSFCH messages and may also be contiguous with AGC resource 405-*c*. In some aspects, receiving the PSFCH messages in the set of PSFCH resources 410-*c* may be based on the AGC training performed in AGC resources 405-*c* and 405-*d*. After a last PSFCH resource of the set of PSFCH resources 410-*c*, a set of contiguous gap resources 420-*b* may occur. In some aspects, communication scheme 400-*c* may be employed when a subcarrier spacing is equal to 960 kHz.

As subcarrier spacing is varied, a sampling rate may remain the same. Generally, an AGC settling time may be dependent on a number of samples. Accordingly, the AGC settling time may not be SCS-agnostic. However, a quantity of symbols and/or slots for performing AGC may vary with the subcarrier spacing. For instance, as depicted in FIG. 4B, a single AGC resource 405-*b* (e.g., a single slot) may be used for performing AGC training. However, as depicted in FIG. 4C, multiple AGC resources 405-*c* and 405-*d* (e.g., multiple slots) may be used for performing AGC training.

Figure 5A:
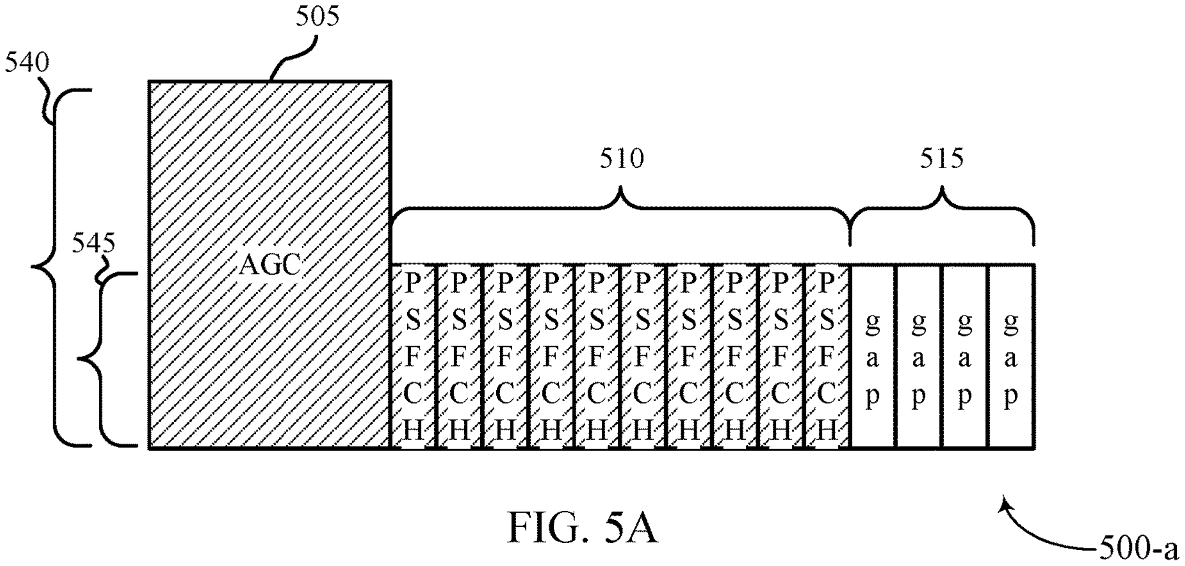
FIGS. 5A and 5B show aspects of communication schemes that support automatic gain control designs for sidelink feedback in accordance with one or more aspects of the present disclosure.
Figure 5B:
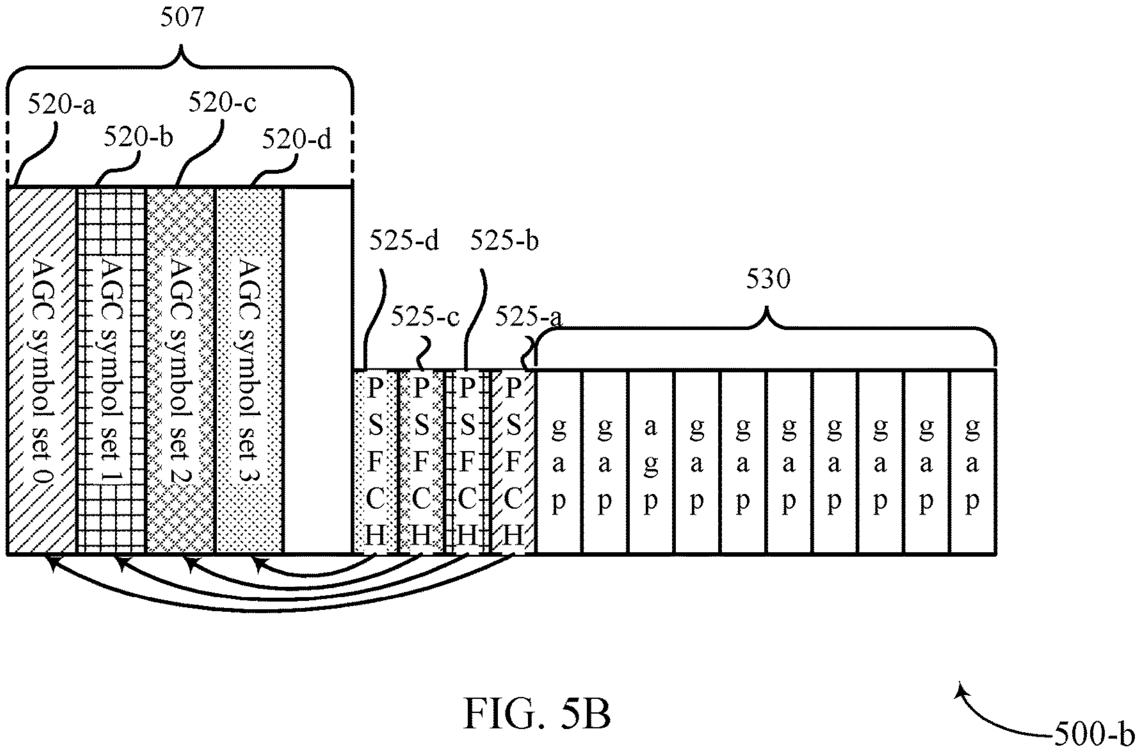

FIGS. 5A and 5B show aspects of communication schemes 500-*a* and 500-*b* that support automatic gain control designs for sidelink feedback in accordance with one or more aspects of the present disclosure. In some aspects, communication schemes 500-*a* and/or 500-*b* may implement one or more aspects of wireless communications systems 200-*a*. For instance, AGC resource 505 and/or AGC resource 507 may each be an aspect of an AGC resource 205-*a* as described with reference to FIG. 2A; set of PSFCH resources 510 may include PSFCH resources that may be an aspect of one or more of PSFCH resources 210-*a*, 210-*b*, or 210-*c* as described with reference to FIG. 2A; PSFCH resources 525-*a*, 525-*b*, 525-*c*, 525-*d* may each be an aspect of one or more of PSFCH resources 210-*a*, 210-*b*, or 210-*c* as described with reference to FIG. 2A; or any combination thereof.

In communication scheme 500-*a*, an AGC resource 505 used for AGC training may be scheduled. AGC resource 505 may be contiguous with a set of PSFCH resources 510 used for communicating PSFCH messages. In some aspects, receiving the PSFCH messages in the set of PSFCH resources 510 may be based on the AGC training performed in AGC resource 505. For instance, AGC resource 505 may be common to each of the PSFCH resources in the set of PSFCH resources 510. After a last PSFCH resource of the set of PSFCH resources 510, a set of contiguous gap resources 515 may occur. A first bandwidth 540 of AGC resource 505 may be greater than a second bandwidth 545 of each of the set of PSFCH resources 510.

In communication scheme 500-*b*, an AGC resource 507 used for AGC training may be scheduled. AGC resource 507 may be contiguous with a first PSFCH resource 525-*d* of a set of PSFCH resources that are contiguous in time, where the set of contiguous PSFCH resources may include a first PSFCH resource 525-*d*, a second PSFCH resource 525-*c*, a third PSFCH resource 525-*b*, and a fourth PSFCH resource 525-*a*. In some aspects, AGC resource 507 may include multiple symbol sets. For instance, AGC resource 507 may include a first AGC symbol set 520-*a*, a second AGC symbol set 520-*b*, a third AGC symbol set 520-*c*, and a fourth AGC symbol set 520-*d*. Each AGC symbol set may map to a respective PSFCH resource of the set of contiguous PSFCH resources. For instance, an AGC signal sent over first AGC symbol set 520-*a* may be used to estimate a gain for receiving a PSFCH message over fourth PSFCH resource 525-*a*; an AGC signal sent over second AGC symbol set 520-*b* may be used to estimate a gain for receiving a PSFCH message over third PSFCH resource 525-*b*; an AGC signal sent over third AGC symbol set 520-*c* may be used to estimate a gain for receiving a PSFCH message over second PSFCH resource 525-*c*; and an AGC signal sent over fourth AGC symbol set 520-*d* may be used to estimate a gain for receiving a PSFCH message over first PSFCH resource 525-*d*. It should be understood that the mapping from PSFCH resources 525-*a*, 525-*b*, 525-*c*, and 525-*d* to AGC symbol sets 520-*a*, 520-*b*, 520-*c*, and 520-*d* may be different than what is illustrated without deviating from the scope of the present disclosure.

In some aspects, the AGC resource 507 may span a slot. Additionally, AGC resource 507 may have a first bandwidth greater than a second bandwidth of each of PSFCH resources 525-*a*, 525-*b*, 525-*c*, and 525-*d*. A set of contiguous gap symbols 530 may follow the fourth PSFCH resource 525-*a*. It should be noted that a quantity of PSFCH resources within the set of contiguous PSFCH resources, a quantity of AGC symbol sets, and a quantity of gap symbols within the set of contiguous gap symbols 530 may vary without deviating from the scope of the present disclosure.

Figure 6A:
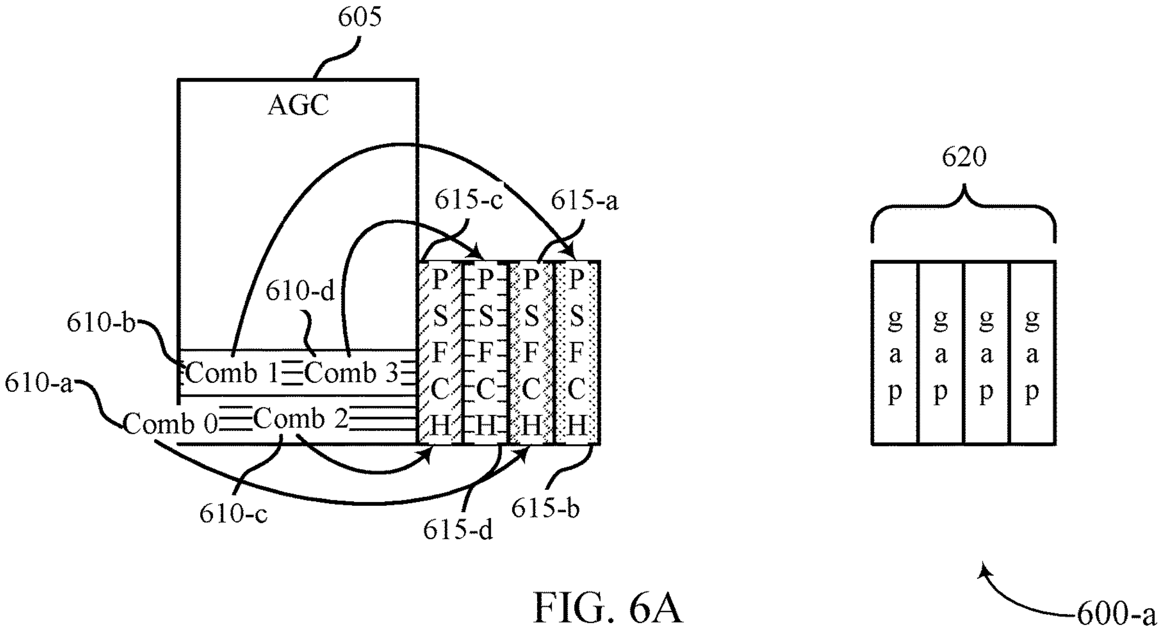
FIGS. 6A and 6B show aspects of communication schemes that support automatic gain control designs for sidelink feedback in accordance with one or more aspects of the present disclosure.
Figure 6B:
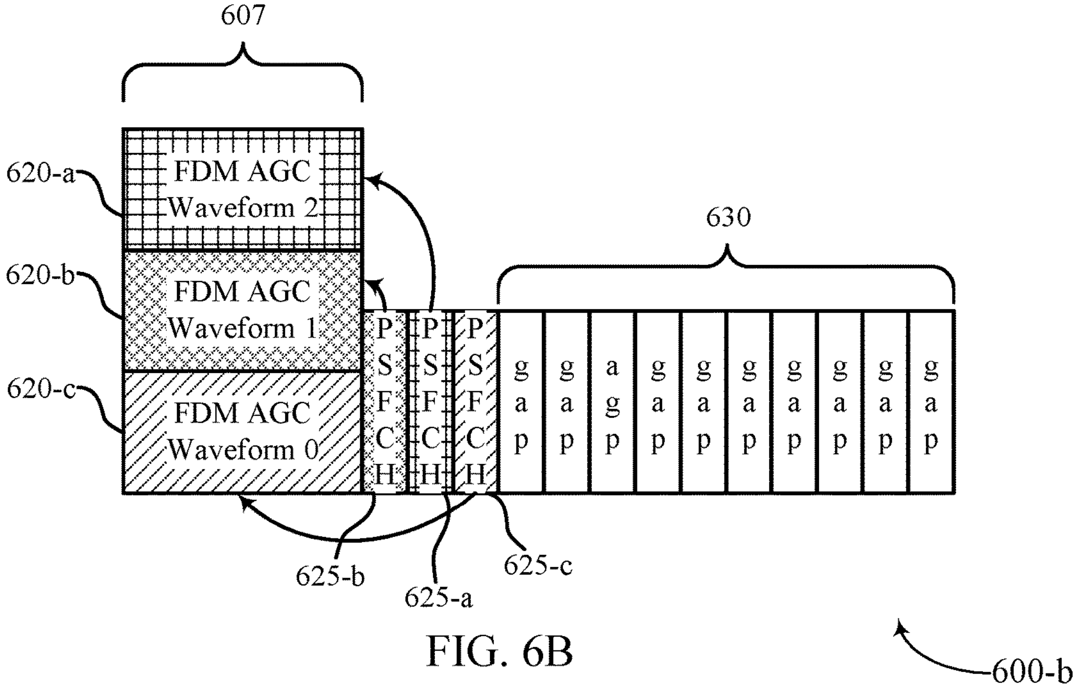

FIGS. 6A and 6B show aspects of communication schemes 600-*a* and 600-*b* that support automatic gain control designs for sidelink feedback in accordance with one or more aspects of the present disclosure. In some aspects, communication schemes 600-*a* and/or 600-*b* may implement one or more aspects of wireless communications systems 200-*a*. For instance, AGC resources 605 and/or 607 may each be an aspect of an AGC resource 205-*a* as described with reference to FIG. 2A; PSFCH resources 615-*a*, 615-*b*, 615-*c*, 615-*d*, 625-*a*, 625-*b*, and/or 625-*c* may each be an aspect of one or more of PSFCH resources 210-*a*, 210-*b*, or 210-*c* as described with reference to FIG. 2A; or any combination thereof.

In communication scheme 600-*a*, an AGC resource 605 used for AGC training may be scheduled. AGC resource 605 may be contiguous with a first PSFCH resource 615-*c* of a set of PSFCH resources, where the set of contiguous PSFCH resources may include a first PSFCH resource 615-*c*, a second PSFCH resource 615-*d*, a third PSFCH resource 615-*a*, and a fourth PSFCH resource 615-*b*. The set of PSFCH resources may include a respective set of time resources that are contiguous in time. In some aspects, signals associated with particular frequency combs may be transmitted within AGC resource 605. For instance, a first signal with a first frequency comb index 610-*a*, a second signal with a second frequency comb index 610-*b*, a third signal with a third frequency comb index 610-*c* and a fourth signal with a fourth frequency comb index 610-*d* may be transmitted (e.g., by different UEs) in AGC resource 605. In some aspects, the first signal may be used to determine a gain for receiving a PSFCH message in third PSFCH resource 615-*a*; the second signal may be used to determine a gain for receiving a PSFCH message in in fourth PSFCH resource 615-*b*; the third signal may be used to determine a gain for receiving a PSFCH message in first PSFCH resource 615-*c*; and the fourth signal may be used to determine a gain for receiving a PSFCH message in second PSFCH resource 615-*d*. It should be understood that the mapping from PSFCH resources 615-*a*, 615-*b*, 615-*c*, and 615-*d* to frequency comb indices 610-*a*, 610-*b*, 610-*c*, and 610-*d* may be different than what is illustrated without deviating from the scope of the present disclosure.

In some aspects, greater than one AGC resource 605 may be employed (e.g., if the subcarrier spacing is 960 kHz or greater). In some aspects, AGC resource 605 may have a first bandwidth greater than a second bandwidth of each of PSFCH resources 615-*a*, 615-*b*, 615-*c*, and 615-*d*. A set of contiguous gap symbols 620 may follow the fourth PSFCH resource 615-*b*. It should be noted that a quantity of PSFCH resources within the set of PSFCH resources, a quantity of signals associated with respective frequency comb indices and a quantity of gap symbols within the set of contiguous gap symbols 620 may vary without deviating from the scope of the present disclosure.

In communication scheme 600-*b*, an AGC resource 607 used for AGC training may be scheduled. AGC resource 607 may be contiguous with a first PSFCH resource 625-*b* of a set of PSFCH resources, where the set of PSFCH resources may include a first PSFCH resource 625-*b*, a second PSFCH resource 625-*a*, and a third PSFCH resource 625-*c*. The set of PSFCH resources may include a respective set of time resources that are contiguous in time. In some aspects, AGC resource 607 may include multiple sets of contiguous RBs. For instance, AGC resource 607 may include a first set of contiguous RBs 620-*a*, a second set of contiguous RBs 620-*b*, and a third set of contiguous RBs 620-*c*. Each set of contiguous RBs may map to a respective PSFCH resource of the set of PSFCH resources. For instance, the first set of contiguous RBs 620-*a* may be used for determining a gain for receiving a PSFCH message in second PSFCH resource 625-*a*; the second set of contiguous RBs 620-*b* may be used for determining a gain for receiving a PSFCH message in first PSFCH resource 625-*b*; and the third set of contiguous RBs 620-*c* may be used for determining a gain for receiving a PSFCH message in third PSFCH resource 625-*c*. It should be understood that the mapping from PSFCH resources 625-*a*, 625-*b*, and 625-*c* to sets of contiguous RBs 620-*a*, 620-*b*, and 620-*c* be different than what is illustrated without deviating from the scope of the present disclosure.

In some aspects, AGC resource 607 may span one or more slots. In some aspects, AGC resource 607 may have a first bandwidth greater than a second bandwidth of each of PSFCH resources 625-*a*, 625-*b*, and 625-*c*. A set of contiguous gap symbols 630 may follow the third PSFCH resource 625-*c*. It should be noted that a quantity of time resources within the set of contiguous time resources, a quantity of sets of contiguous RBs, and a quantity of gap symbols within the set of contiguous gap symbols 630 may vary without deviating from the scope of the present disclosure.

Figure 7:
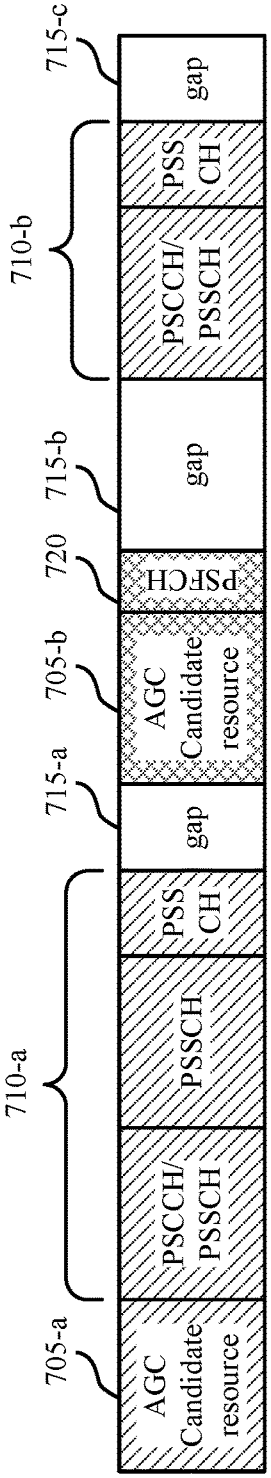
FIG. 7 shows an aspect of a communication scheme that supports automatic gain control designs for sidelink feedback in accordance with one or more aspects of the present disclosure.

FIG. 7 shows an aspect of a communication scheme 700 that supports automatic gain control designs for sidelink feedback in accordance with one or more aspects of the present disclosure. In some aspects, communication scheme 700 may implement one or more aspects of wireless communications system 200-*b*. For instance, AGC candidate resource 705-*a* may be an aspect of AGC resource 205-*b* as described with reference to FIG. 2B; a sidelink resource of a set of sidelink resources 710-*a* may be an aspect of resource 215-*a* as described with reference to FIG. 2B; AGC candidate resource 705-*b* may be an aspect of AGC resource 205-*c* as described with reference to FIG. 2B; PSFCH resource 720 may be an aspect of PSFCH resource 210-*d* as described with reference to FIG. 2B; a sidelink resource of the set of sidelink resources 710-*b* may be an aspect of resource 215-*b* as described with reference to FIG. 2B; or any combination thereof.

In communication scheme 700, an AGC candidate resource 705-*a* may be scheduled that may be used for AGC training. The AGC candidate resource 705-*a* may be contiguous with a set of sidelink resources 710-*a* for communicating PSCCH and/or PSSCH messages. In some aspects, receiving the PSCCH and/or PSCCH messages in the set of sidelink resources may be based on the AGC training performed in AGC candidate resource 705-*a*. For instance, a first gain may be determined from a signal received in AGC candidate resource 705-*a* that may be used to receive PSSCH and/or PSCCH transmissions within the set of sidelink resources 710-*a*.

A gap 715-*a* may occur between the set of sidelink resources 710-*a* and AGC candidate resource 705-*b*. During AGC candidate resource 705-*b*, AGC training for receiving a PSFCH message over PSFCH resource 720 may be performed. For instance, a second gain may be determined from a signal received in AGC candidate resource 705-*b* that may be used to receive the PSFCH message within the PSFCH resource 720. In some aspects, a gap 715-*b* may occur following PSFCH resource 720. After the gap 715-*b*, a set of sidelink resources 710-*b* for communicating PSSCH and/or PSCCH messages may occur. The first gain determined from AGC candidate resource 705-*a* may be used to receive one or more messages within the set of sidelink resources 710-*b*. After the set of sidelink resources 710-*b*, a gap 715-*c* may occur. In some aspects, AGC candidate resource 705-*a* may be associated with a first AGC period, where the first AGC period includes set of sidelink resources 710-*a*, and AGC candidate resource 705-*b* may be associated with a second AGC period, where the second AGC period includes PSFCH resource 720 and the set of sidelink resources 710-*b*.

Figure 8:
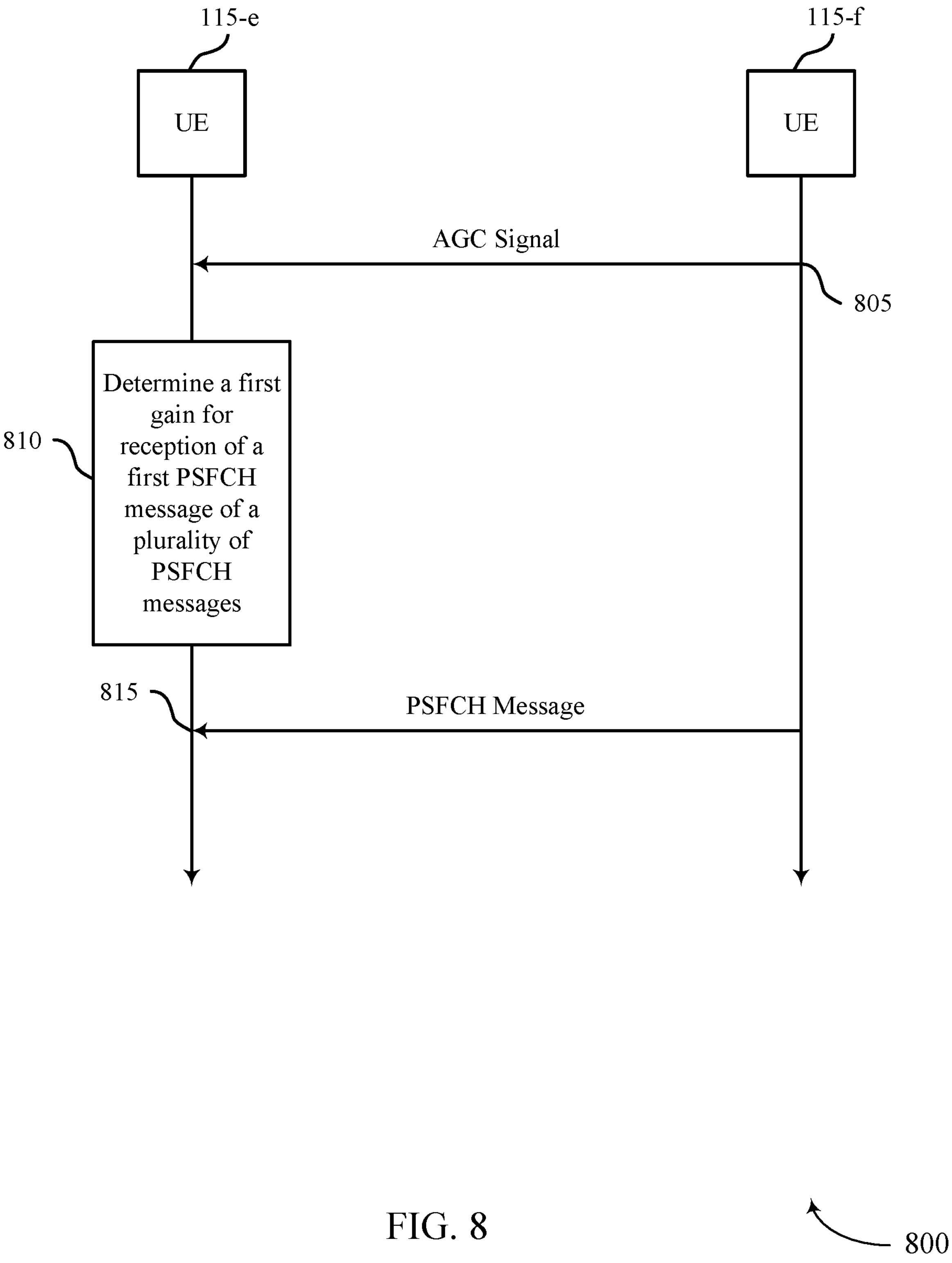
FIG. 8 shows an aspect of a process flow that supports automatic gain control designs for sidelink feedback in accordance with one or more aspects of the present disclosure.

FIG. 8 shows an aspect of a process flow 800 that supports automatic gain control designs for sidelink feedback in accordance with one or more aspects of the present disclosure. In some aspects, process flow 800 may implement one or more aspects of FIGS. 1 through 7. For instance, UE 115-*e* may be an aspect of a UE 115 as described with reference to FIG. 1 and/or UE 115-*b* as described with reference to FIG. 2A. Additionally, or alternatively, UE 115-*f* may be an aspect of a UE 115 as described with reference to FIG. 1 and/or UE 115-*a* as described with reference to FIG. 2A.

At 805, UE 115-*f* may transmit a signal in an AGC resource. UE 115-*e* may receive the signal in the AGC resource. In some aspects, the signal may include or may be a reference signal associated with a Chu sequence or a pseudo-random sequence. In some aspects, the AGC resource may include multiple symbol sets, where each symbol set of the multiple symbol sets maps to a respective PSFCH resource of a set of PSFCH resources. Each of the set of PSFCH resources may be associated with a respective one of a set of TDMed time resources Additionally, or alternatively, the AGC resource may include multiple sets of contiguous resource blocks, where each set of contiguous resource blocks may map to a respective PSFCH resource of the set of PSFCH resources. In some aspects, the AGC resource spans a first duration of a slot, a second duration of multiple symbols, or both.

In some aspects, receiving the signal may be based on a first frequency comb index of a set of frequency comb indices, where each frequency comb index of the set of frequency comb indices may map to a respective PSFCH resource of the set of PSFCH resources. In some aspects, receiving the signal may be based on a first sequence index of a set of sequence indices (e.g., a first cyclic shift index of a set of cyclic shift indices).

At 810, UE 115-*e* may determine a gain for reception of a first PSFCH message based on receiving the signal.

At 815, UE 115-*f* may transmit the first PSFCH message. UE 115-*e* may receive the first PSFCH message based on the gain. In some aspects, the first PSFCH message may be one of a set of PSFCH messages that are time-division multiplexed over a set of contiguous time resources. A starting time resource of the set of contiguous time resources may be contiguous with the AGC resource and a first time spanned by the AGC resource may be greater than a second time period spanned by each PSFCH message of the set of PSFCH messages. In some aspects, receiving the first PSFCH message over a first time resource of the set of contiguous time resources is based on the first time resource mapping to a symbol set of the multiple symbol sets, a set of contiguous resource blocks of the multiple sets of contiguous resource blocks, the first frequency comb index, the first sequence index, or any combination thereof. In some aspects, a first bandwidth spanned by the signal in the AGC resource is greater than a respective bandwidth spanned by each of the set of PSFCH messages. In some aspects, each time resource of the set of contiguous time resources spans a duration of a symbol or a multiple of the duration of the symbol.

Figure 9:
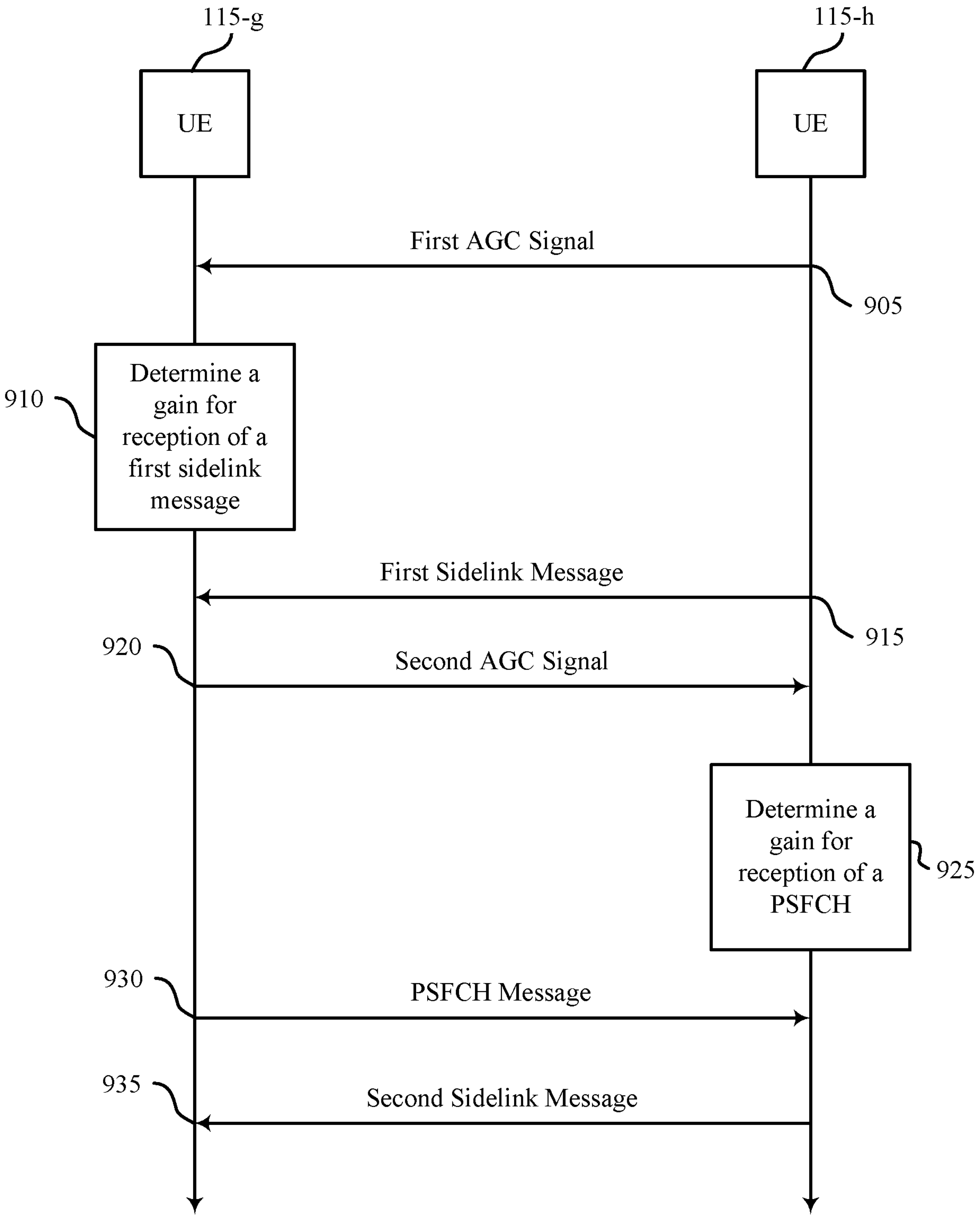
FIG. 9 shows an aspect of a process flow that supports automatic gain control designs for sidelink feedback in accordance with one or more aspects of the present disclosure.

FIG. 9 shows an aspect of a process flow 900 that supports automatic gain control designs for sidelink feedback in accordance with one or more aspects of the present disclosure. In some aspects, process flow 800 may implement one or more aspects of FIGS. 1 through 7. For instance, UE 115-*g* may be an aspect of a UE 115 as described with reference to FIG. 1 and/or UE 115-*d* as described with reference to FIG. 2B. Additionally, or alternatively, UE 115-*h* may be an aspect of a UE 115 as described with reference to FIG. 1 and/or UE 115-*c* as described with reference to FIG. 2B.

At 905, UE 115-*h* may transmit a first signal in a first AGC resource. UE 115-*g* may receive the first signal.

At 910, UE 115-*g* may determine a gain for reception of a first sidelink message.

At 915, UE 115-*h* may transmit the first sidelink message over a first time resource contiguous with the first AGC resource (e.g., based on transmitting the first signal). UE 115-*g* may receive the first sidelink message over the first time resource. The first sidelink message may be associated with a control channel or a shared channel (e.g., may be a PSSCH message or a PSCCH message).

At 920, UE 115-*g* may transmit a second signal in a second AGC resource. UE 115-*h* may receive the second signal. In some aspects, one or more of the first AGC resource or the second AGC resource may span a duration of a slot.

At 925, UE 115-*g* may determine a gain for reception of a PSFCH message based on receiving the second signal.

At 930, UE 115-*g* may transmit the PSFC message over a second time resource occurring after the second AGC resource (e.g., based on transmitting the second signal). In some aspects, the second time resource may be contiguous with the second AGC resource.

At 935, UE 115-*h* may transmit a second sidelink message over a third time resource. UE 115-*g* may receive the second sidelink message using the gain determined based on the first signal (e.g., determined at 910). The third time resource may occur after the second time resource and the second time resource may occur after the first time resource. In some aspects, the second time resource may be non-contiguous with the third time resource (e.g., a gap may occur between the second and third time resources). In some aspects, one or more of the first time resource, the second time resource, or the third time resource may span a duration of a symbol or a multiple of the duration of the symbol. In some aspects, the second sidelink message may be associated with the control channel or the shared channel (e.g., may be a PSSCH message or a PSCCH message).

Figure 10:
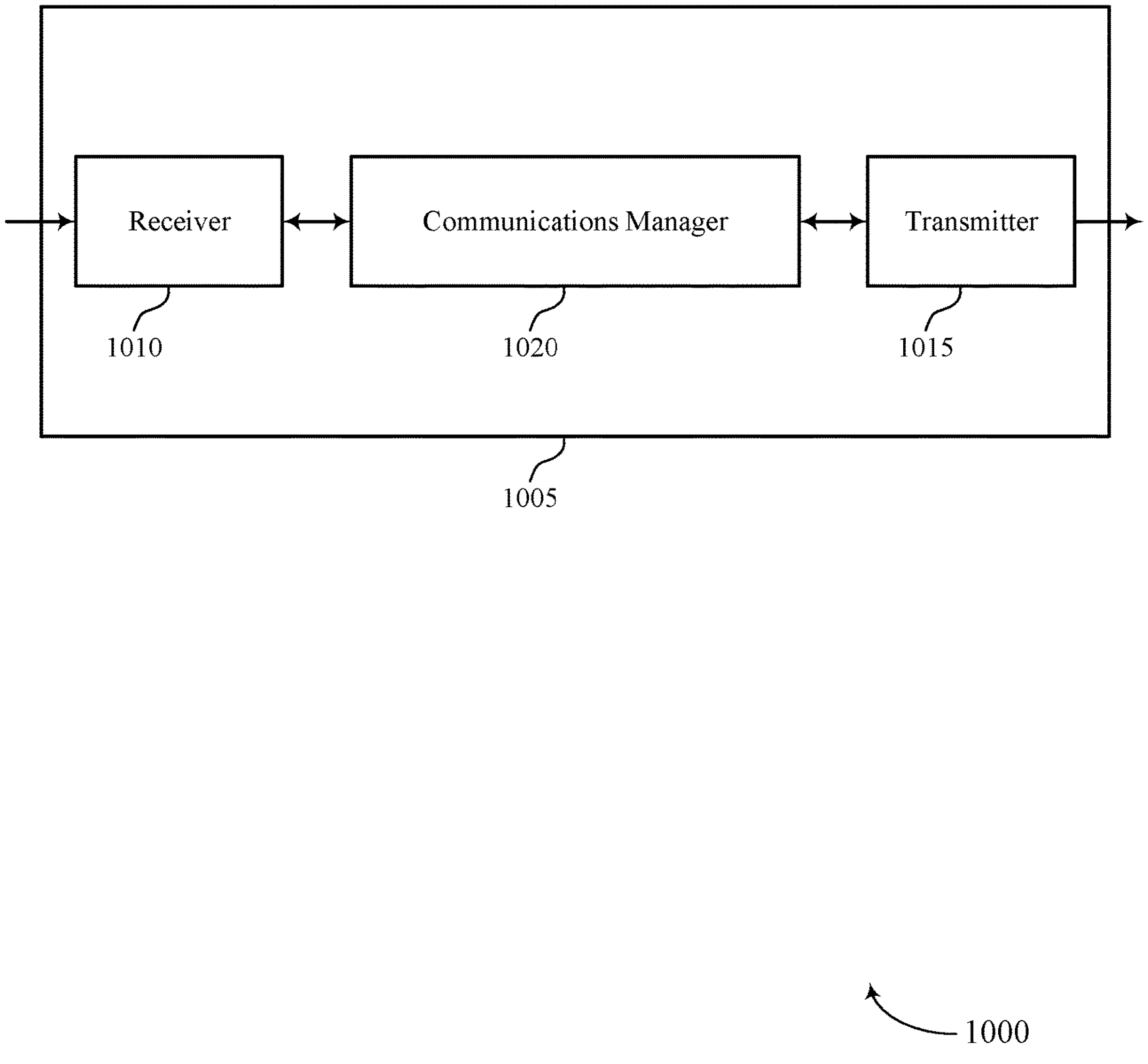
FIGS. 10 and 11 show block diagrams of devices that support automatic gain control designs for sidelink feedback in accordance with one or more aspects of the present disclosure.

FIG. 10 shows a block diagram 1000 of a device 1005 that supports automatic gain control designs for sidelink feedback in accordance with one or more aspects of the present disclosure. The device 1005 may be an aspect of aspects of a UE 115 as described herein. The device 1005 may include a receiver 1010, a transmitter 1015, and a communications manager 1020. The device 1005, or one or more components of the device 1005 (e.g., the receiver 1010, the transmitter 1015, and the communications manager 1020), may include at least one processor, which may be coupled with at least one memory, to, individually or collectively, support or enable the described techniques. Each of these components may be in communication with one another (e.g., via one or more buses).

The receiver 1010 may provide a means for receiving information such as packets, user data, control information, or any combination thereof associated with various information channels (e.g., control channels, data channels, information channels related to automatic gain control designs for sidelink feedback). Information may be passed on to other components of the device 1005. The receiver 1010 may utilize a single antenna or a set of multiple antennas.

The transmitter 1015 may provide a means for transmitting signals generated by other components of the device 1005. For instance, the transmitter 1015 may transmit information such as packets, user data, control information, or any combination thereof associated with various information channels (e.g., control channels, data channels, information channels related to automatic gain control designs for sidelink feedback). In some aspects, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be aspects of means for performing various aspects of automatic gain control designs for sidelink feedback as described herein. For instance, the communications manager 1020, the receiver 1010, the transmitter 1015, or various combinations or components thereof may be capable of performing one or more of the functions described herein.

In some aspects, the communications manager 1020, the receiver 1010, the transmitter 1015, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some aspects, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 1020, the receiver 1010, the transmitter 1015, or various combinations or components thereof may be implemented in code (e.g., as communications management software or firmware) executed by at least one processor. If implemented in code executed by at least one processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some aspects, the communications manager 1020 may be configured to perform various operations (e.g., receiving, obtaining, monitoring, outputting, transmitting) using or otherwise in cooperation with the receiver 1010, the transmitter 1015, or both. For instance, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications in accordance with aspects as disclosed herein. For instance, the communications manager 1020 is capable of, configured to, or operable to support a means for receiving a signal in an automatic gain control (AGC) resource. The communications manager 1020 is capable of, configured to, or operable to support a means for receiving a first PSFCH message based on a gain for reception of the first PSFCH message, where the gain for reception of the first PSFCH message is based on receiving the signal, where the first PSFCH message is one of a set of multiple PSFCH messages that are time-division multiplexed over a set of multiple contiguous time resources, where a starting time resource of the set of multiple contiguous time resources is contiguous with the AGC resource, and where a first time period spanned by the AGC resource is greater than a second time period spanned by each PSFCH message of the set of multiple PSFCH messages.

Additionally, or alternatively, the communications manager 1020 may support wireless communications in accordance with aspects as disclosed herein. For instance, the communications manager 1020 is capable of, configured to, or operable to support a means for receiving a first signal in a first automatic gain control (AGC) resource. The communications manager 1020 is capable of, configured to, or operable to support a means for receiving a first sidelink message over a first time resource contiguous with the first AGC resource using a gain for reception of the first sidelink message, where the gain is based on based on receiving the first signal, and where the first sidelink message is associated with control channel or a shared channel. The communications manager 1020 is capable of, configured to, or operable to support a means for transmitting a second signal in a second AGC resource. The communications manager 1020 is capable of, configured to, or operable to support a means for transmitting a physical sidelink feedback channel (PSFCH) message over a second time resource occurring after the second AGC resource based on transmitting the second signal. The communications manager 1020 is capable of, configured to, or operable to support a means for receiving a second sidelink message over a third time resource using the gain based on receiving the first signal, where the third time resource occurs after the second time resource, and where the second time resource occurs after the first time resource.

Additionally, or alternatively, the communications manager 1020 may support wireless communications in accordance with aspects as disclosed herein. For instance, the communications manager 1020 is capable of, configured to, or operable to support a means for transmitting a signal in an automatic gain control (AGC) resource. The communications manager 1020 is capable of, configured to, or operable to support a means for transmitting a first PSFCH message based on transmitting the signal in the AGC resource, where the first PSFCH message is one of a set of multiple PSFCH messages that are time-division multiplexed over a set of multiple contiguous time resources, where a starting time resource of the set of multiple contiguous time resources is contiguous with the AGC resource, and where a first time period spanned by the AGC resource is greater than a second time period spanned by each PSFCH message of the set of multiple PSFCH messages.

Additionally, or alternatively, the communications manager 1020 may support wireless communications in accordance with aspects as disclosed herein. For instance, the communications manager 1020 is capable of, configured to, or operable to support a means for transmitting a first signal in a first automatic gain control (AGC) resource. The communications manager 1020 is capable of, configured to, or operable to support a means for transmitting a first sidelink message over a first time resource contiguous with the first AGC resource, where the first sidelink message is associated with a control channel or a shared channel. The communications manager 1020 is capable of, configured to, or operable to support a means for receiving a second signal in a second AGC resource. The communications manager 1020 is capable of, configured to, or operable to support a means for receiving a physical sidelink feedback channel (PSFCH) message over a second time resource occurring after the second AGC resource based on a gain for reception of the PSFCH message, where the gain is based on receiving the second signal. The communications manager 1020 is capable of, configured to, or operable to support a means for transmitting a second sidelink message over a third time resource based on transmitting the first signal in the first AGC resource, where the third time resource occurs after the second time resource, and where the second time resource occurs after the first time resource.

By including or configuring the communications manager 1020 in accordance with aspects as described herein, the device 1005 (e.g., at least one processor controlling or otherwise coupled with the receiver 1010, the transmitter 1015, the communications manager 1020, or a combination thereof) may support techniques for a greater quantity of resources to be utilized in an AGC period used for communicating PSFCH messages (e.g., via time-division multiplexing of multiple PSFCH messages and/or communicating PSCCH and/or PSSCH messages within the AGC period).

Figure 11:
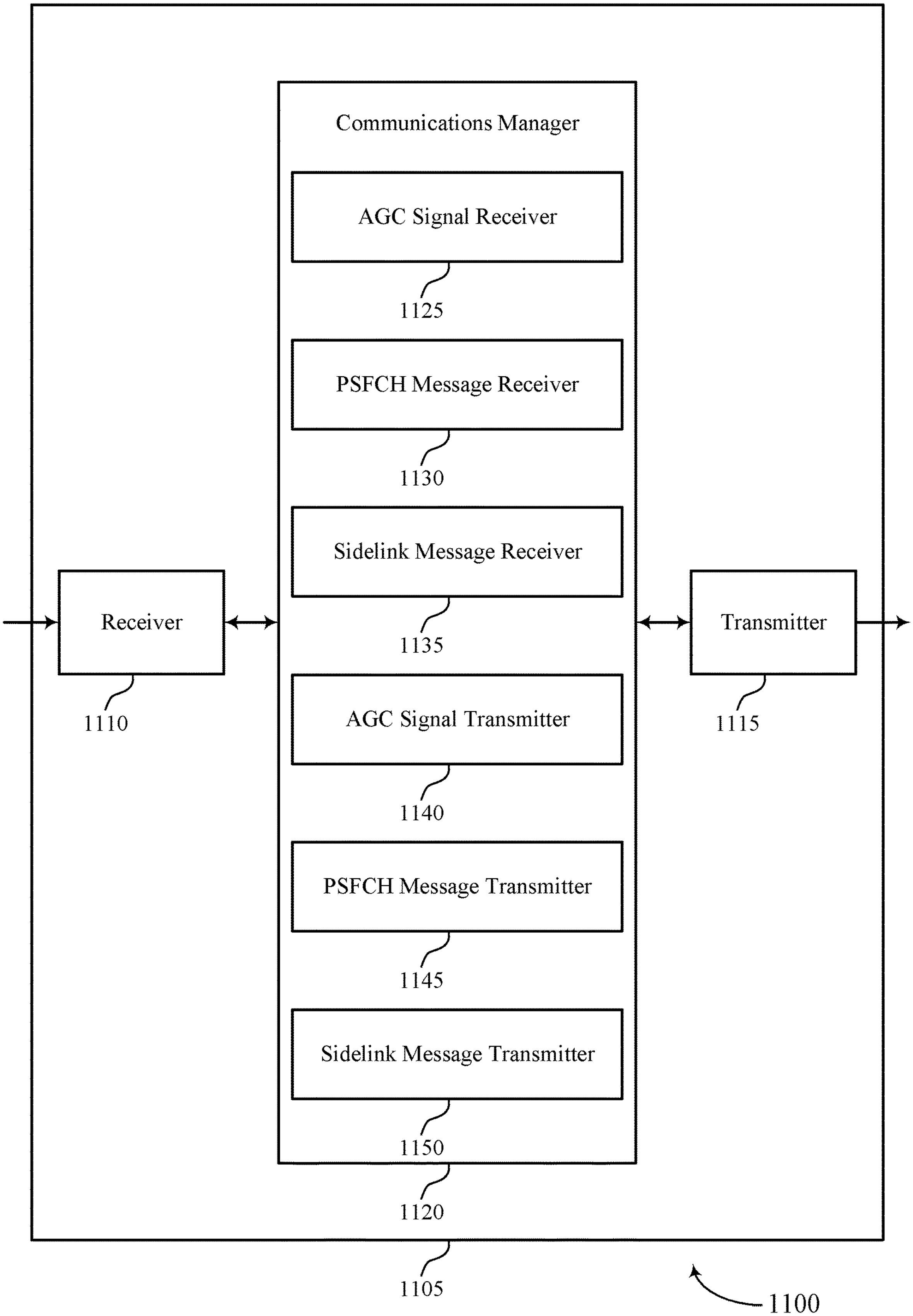

FIG. 11 shows a block diagram 1100 of a device 1105 that supports automatic gain control designs for sidelink feedback in accordance with one or more aspects of the present disclosure. The device 1105 may be an aspect of aspects of a device 1005 or a UE 115 as described herein. The device 1105 may include a receiver 1110, a transmitter 1115, and a communications manager 1120. The device 1105, or one of more components of the device 1105 (e.g., the receiver 1110, the transmitter 1115, and the communications manager 1120), may include at least one processor, which may be coupled with at least one memory, to support the described techniques. Each of these components may be in communication with one another (e.g., via one or more buses).

The receiver 1110 may provide a means for receiving information such as packets, user data, control information, or any combination thereof associated with various information channels (e.g., control channels, data channels, information channels related to automatic gain control designs for sidelink feedback). Information may be passed on to other components of the device 1105. The receiver 1110 may utilize a single antenna or a set of multiple antennas.

The transmitter 1115 may provide a means for transmitting signals generated by other components of the device 1105. For instance, the transmitter 1115 may transmit information such as packets, user data, control information, or any combination thereof associated with various information channels (e.g., control channels, data channels, information channels related to automatic gain control designs for sidelink feedback). In some aspects, the transmitter 1115 may be co-located with a receiver 1110 in a transceiver module. The transmitter 1115 may utilize a single antenna or a set of multiple antennas.

The device 1105, or various components thereof, may be an aspect of means for performing various aspects of automatic gain control designs for sidelink feedback as described herein. For instance, the communications manager 1120 may include an AGC signal receiver 1125, an PSFCH message receiver 1130, a sidelink message receiver 1135, an AGC signal transmitter 1140, an PSFCH message transmitter 1145, a sidelink message transmitter 1150, or any combination thereof. The communications manager 1120 may be an aspect of aspects of a communications manager 1020 as described herein. In some aspects, the communications manager 1120, or various components thereof, may be configured to perform various operations (e.g., receiving, obtaining, monitoring, outputting, transmitting) using or otherwise in cooperation with the receiver 1110, the transmitter 1115, or both. For instance, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications in accordance with aspects as disclosed herein. The AGC signal receiver 1125 is capable of, configured to, or operable to support a means for receiving a signal in an automatic gain control (AGC) resource. The PSFCH message receiver 1130 is capable of, configured to, or operable to support a means for receiving a first PSFCH message based on a gain for reception of the first PSFCH message, where the gain for reception of the first PSFCH message is based on receiving the signal, where the first PSFCH message is one of a set of multiple PSFCH messages that are time-division multiplexed over a set of multiple contiguous time resources, where a starting time resource of the set of multiple contiguous time resources is contiguous with the AGC resource, and where a first time period spanned by the AGC resource is greater than a second time period spanned by each PSFCH message of the set of multiple PSFCH messages.

Additionally, or alternatively, the communications manager 1120 may support wireless communications in accordance with aspects as disclosed herein. The AGC signal receiver 1125 is capable of, configured to, or operable to support a means for receiving a first signal in a first automatic gain control (AGC) resource. The sidelink message receiver 1135 is capable of, configured to, or operable to support a means for receiving a first sidelink message over a first time resource contiguous with the first AGC resource using a gain for reception of the first sidelink message, where the gain is based on based on receiving the first signal, and where the first sidelink message is associated with control channel or a shared channel. The AGC signal transmitter 1140 is capable of, configured to, or operable to support a means for transmitting a second signal in a second AGC resource. The PSFCH message transmitter 1145 is capable of, configured to, or operable to support a means for transmitting a physical sidelink feedback channel (PSFCH) message over a second time resource occurring after the second AGC resource based on transmitting the second signal. The sidelink message receiver 1135 is capable of, configured to, or operable to support a means for receiving a second sidelink message over a third time resource using the gain based on receiving the first signal, where the third time resource occurs after the second time resource, and where the second time resource occurs after the first time resource.

Additionally, or alternatively, the communications manager 1120 may support wireless communications in accordance with aspects as disclosed herein. The AGC signal transmitter 1140 is capable of, configured to, or operable to support a means for transmitting a signal in an automatic gain control (AGC) resource. The PSFCH message transmitter 1145 is capable of, configured to, or operable to support a means for transmitting a first PSFCH message based on transmitting the signal in the AGC resource, where the first PSFCH message is one of a set of multiple PSFCH messages that are time-division multiplexed over a set of multiple contiguous time resources, where a starting time resource of the set of multiple contiguous time resources is contiguous with the AGC resource, and where a first time period spanned by the AGC resource is greater than a second time period spanned by each PSFCH message of the set of multiple PSFCH messages.

Additionally, or alternatively, the communications manager 1120 may support wireless communications in accordance with aspects as disclosed herein. The AGC signal transmitter 1140 is capable of, configured to, or operable to support a means for transmitting a first signal in a first automatic gain control (AGC) resource. The sidelink message transmitter 1150 is capable of, configured to, or operable to support a means for transmitting a first sidelink message over a first time resource contiguous with the first AGC resource, where the first sidelink message is associated with a control channel or a shared channel. The AGC signal receiver 1125 is capable of, configured to, or operable to support a means for receiving a second signal in a second AGC resource. The PSFCH message receiver 1130 is capable of, configured to, or operable to support a means for receiving a physical sidelink feedback channel (PSFCH) message over a second time resource occurring after the second AGC resource based on a gain for reception of the PSFCH message, where the gain is based on receiving the second signal. The sidelink message transmitter 1150 is capable of, configured to, or operable to support a means for transmitting a second sidelink message over a third time resource based on transmitting the first signal in the first AGC resource, where the third time resource occurs after the second time resource, and where the second time resource occurs after the first time resource.

Figure 12:
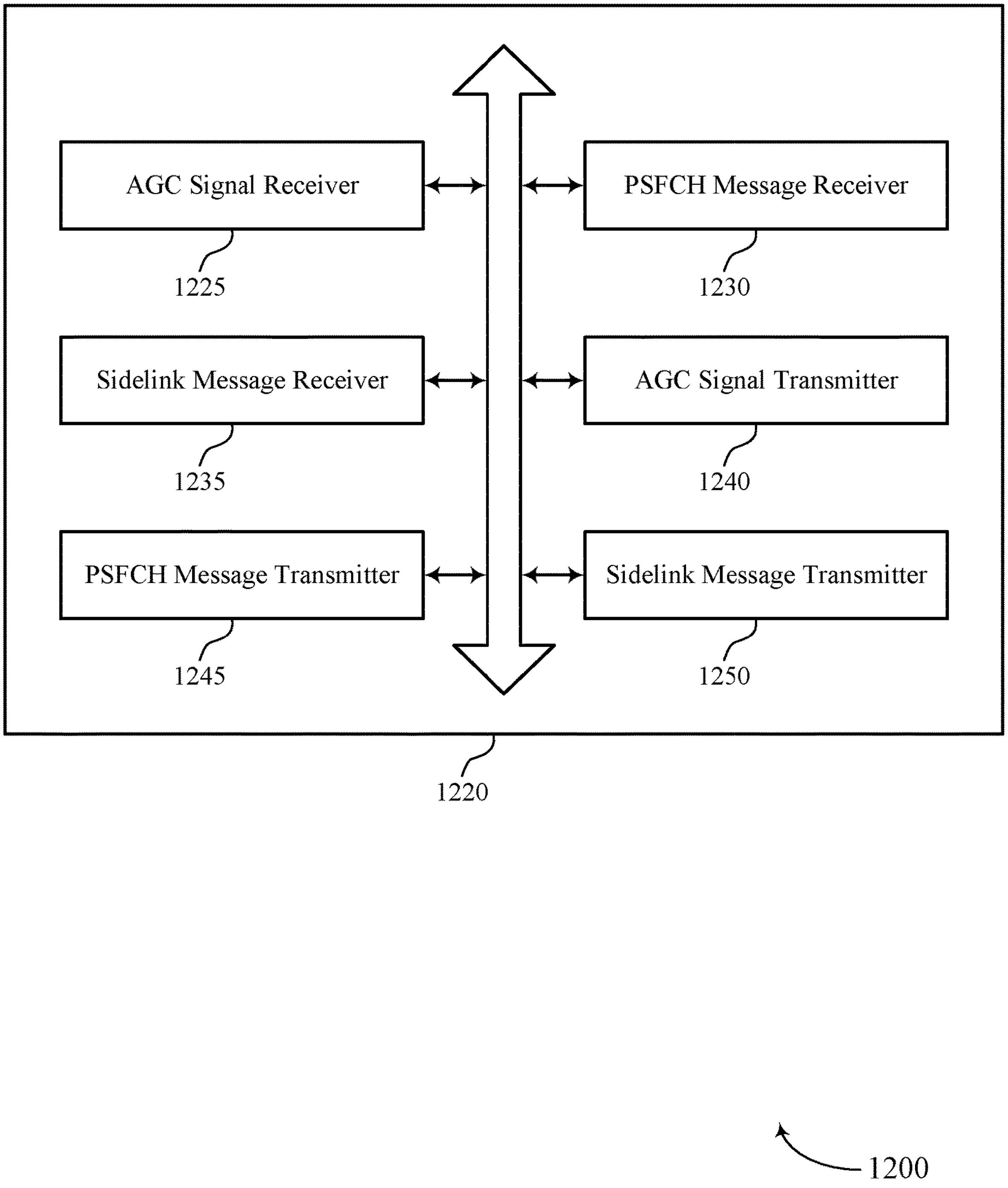
FIG. 12 shows a block diagram of a communications manager that supports automatic gain control designs for sidelink feedback in accordance with one or more aspects of the present disclosure.

FIG. 12 shows a block diagram 1200 of a communications manager 1220 that supports automatic gain control designs for sidelink feedback in accordance with one or more aspects of the present disclosure. The communications manager 1220 may be an aspect of aspects of a communications manager 1020, a communications manager 1120, or both, as described herein. The communications manager 1220, or various components thereof, may be an aspect of means for performing various aspects of automatic gain control designs for sidelink feedback as described herein. For instance, the communications manager 1220 may include an AGC signal receiver 1225, an PSFCH message receiver 1230, a sidelink message receiver 1235, an AGC signal transmitter 1240, an PSFCH message transmitter 1245, a sidelink message transmitter 1250, or any combination thereof. Each of these components, or components or sub-components thereof (e.g., one or more processors, one or more memories), may communicate, directly or indirectly, with one another (e.g., via one or more buses).

The communications manager 1220 may support wireless communications in accordance with aspects as disclosed herein. The AGC signal receiver 1225 is capable of, configured to, or operable to support a means for receiving a signal in an automatic gain control (AGC) resource. The PSFCH message receiver 1230 is capable of, configured to, or operable to support a means for receiving a first PSFCH message based on a gain for reception of the first PSFCH message, where the gain for reception of the first PSFCH message is based on receiving the signal, where the first PSFCH message is one of a set of multiple PSFCH messages that are time-division multiplexed over a set of multiple contiguous time resources, where a starting time resource of the set of multiple contiguous time resources is contiguous with the AGC resource, and where a first time period spanned by the AGC resource is greater than a second time period spanned by each PSFCH message of the set of multiple PSFCH messages.

In some aspects, the AGC resource includes a set of multiple symbol sets. In some aspects, each symbol set of the set of multiple symbol sets maps to a respective time resource of the set of multiple contiguous time resources. In some aspects, receiving the first PSFCH message over a first time resource of the set of multiple contiguous time resources is based on the first time resource mapping to a symbol set of the set of multiple symbol sets.

In some aspects, the AGC resource includes a set of multiple sets of contiguous resource blocks. In some aspects, each set of contiguous resource blocks maps to a respective time resource of the set of multiple contiguous time resources. In some aspects, receiving the first PSFCH message over a first time resource of the set of multiple contiguous time resources is based on the first time resource mapping to a set of contiguous resource blocks of the set of multiple sets of contiguous resource blocks.

In some aspects, receiving the signal is based on a first frequency comb index of a set of multiple frequency comb indices. In some aspects, each frequency comb index of the set of multiple frequency comb indices maps to a respective time resource of the set of multiple contiguous time resources. In some aspects, receiving the first PSFCH message over a first time resource of the set of multiple contiguous time resources is based on the first time resource mapping to the first frequency comb index of the set of multiple frequency comb indices.

In some aspects, receiving the signal is based on a first sequence index of a set of multiple sequence indices. In some aspects, each sequence index of the set of multiple sequence indices maps to a respective time resource of the set of multiple contiguous time resources. In some aspects, receiving the first PSFCH message over a first time resource of the set of multiple contiguous time resources is based on the first time resource mapping to the first sequence index of the set of multiple sequence indices.

In some aspects, each sequence index of the set of multiple sequence indices includes a respective cyclic shift index.

In some aspects, the signal includes a reference signal associated with a Chu sequence or a pseudo-random sequence.

In some aspects, a first bandwidth spanned by the signal in the AGC resource is greater than a respective bandwidth spanned by each of the set of multiple PSFCH messages.

In some aspects, the AGC resource spans a first duration of a slot, a second duration of a set of multiple symbols, or both.

In some aspects, each time resource of the set of multiple contiguous time resources spans a duration of a symbol or a multiple of the duration of the symbol.

Additionally, or alternatively, the communications manager 1220 may support wireless communications in accordance with aspects as disclosed herein. In some aspects, the AGC signal receiver 1225 is capable of, configured to, or operable to support a means for receiving a first signal in a first automatic gain control (AGC) resource. The sidelink message receiver 1235 is capable of, configured to, or operable to support a means for receiving a first sidelink message over a first time resource contiguous with the first AGC resource using a gain for reception of the first sidelink message, where the gain is based on based on receiving the first signal, and where the first sidelink message is associated with control channel or a shared channel. The AGC signal transmitter 1240 is capable of, configured to, or operable to support a means for transmitting a second signal in a second AGC resource. The PSFCH message transmitter 1245 is capable of, configured to, or operable to support a means for transmitting a physical sidelink feedback channel (PSFCH) message over a second time resource occurring after the second AGC resource based on transmitting the second signal. In some aspects, the sidelink message receiver 1235 is capable of, configured to, or operable to support a means for receiving a second sidelink message over a third time resource using the gain based on receiving the first signal, where the third time resource occurs after the second time resource, and where the second time resource occurs after the first time resource.

In some aspects, the second time resource is contiguous with the second AGC resource.

In some aspects, the second time resource is non-contiguous with the third time resource.

In some aspects, the first time resource, the second time resource, and the third time resource each span a duration of a symbol or a multiple of the duration of the symbol.

In some aspects, the first AGC resource and the second AGC resource each span a duration of a slot.

In some aspects, the second sidelink message is associated with the control channel or the shared channel.

Additionally, or alternatively, the communications manager 1220 may support wireless communications in accordance with aspects as disclosed herein. In some aspects, the AGC signal transmitter 1240 is capable of, configured to, or operable to support a means for transmitting a signal in an automatic gain control (AGC) resource. In some aspects, the PSFCH message transmitter 1245 is capable of, configured to, or operable to support a means for transmitting a first PSFCH message based on transmitting the signal in the AGC resource, where the first PSFCH message is one of a set of multiple PSFCH messages that are time-division multiplexed over a set of multiple contiguous time resources, where a starting time resource of the set of multiple contiguous time resources is contiguous with the AGC resource, and where a first time period spanned by the AGC resource is greater than a second time period spanned by each PSFCH message of the set of multiple PSFCH messages.

In some aspects, the AGC resource includes a set of multiple symbol sets. In some aspects, each symbol set of the set of multiple symbol sets maps to a respective time resource of the set of multiple contiguous time resources. In some aspects, transmitting the first PSFCH message over a first time resource of the set of multiple contiguous time resources is based on the first time resource mapping to a symbol set of the set of multiple symbol sets.

In some aspects, the AGC resource includes a set of multiple sets of contiguous resource blocks. In some aspects, each set of contiguous resource blocks maps to a respective time resource of the set of multiple contiguous time resources. In some aspects, transmitting the first PSFCH message over a first time resource of the set of multiple contiguous time resources is based on the first time resource mapping to a set of contiguous resource blocks of the set of multiple sets of contiguous resource blocks.

In some aspects, transmitting the signal is based on a first frequency comb index of a set of multiple frequency comb indices. In some aspects, each frequency comb index of the set of multiple frequency comb indices maps to a respective time resource of the set of multiple contiguous time resources. In some aspects, transmitting the first PSFCH message over a first time resource of the set of multiple contiguous time resources is based on the first time resource mapping to the first frequency comb index of the set of multiple frequency comb indices.

In some aspects, transmitting the signal is based on a first sequence index of a set of multiple sequence indices. In some aspects, each sequence index of the set of multiple sequence indices maps to a respective time resource of the set of multiple contiguous time resources. In some aspects, transmitting the first PSFCH message over a first time resource of the set of multiple contiguous time resources is based on the first time resource mapping to the first sequence index of the set of multiple sequence indices.

In some aspects, each sequence index of the set of multiple sequence indices includes a respective cyclic shift index.

In some aspects, the signal includes a reference signal associated with a Chu sequence or a pseudo-random sequence.

In some aspects, a first bandwidth spanned by the signal in the AGC resource is greater than a second bandwidth spanned by the set of multiple PSFCH messages.

In some aspects, each time resource of the set of multiple contiguous time resources spans a duration of a symbol or a multiple of the duration of the symbol.

In some aspects, the AGC resource spans a first duration of a slot, a second duration of a set of multiple symbols, or both.

Additionally, or alternatively, the communications manager 1220 may support wireless communications in accordance with aspects as disclosed herein. In some aspects, the AGC signal transmitter 1240 is capable of, configured to, or operable to support a means for transmitting a first signal in a first automatic gain control (AGC) resource. The sidelink message transmitter 1250 is capable of, configured to, or operable to support a means for transmitting a first sidelink message over a first time resource contiguous with the first AGC resource, where the first sidelink message is associated with a control channel or a shared channel. In some aspects, the AGC signal receiver 1225 is capable of, configured to, or operable to support a means for receiving a second signal in a second AGC resource. In some aspects, the PSFCH message receiver 1230 is capable of, configured to, or operable to support a means for receiving a physical sidelink feedback channel (PSFCH) message over a second time resource occurring after the second AGC resource based on a gain for reception of the PSFCH message, where the gain is based on receiving the second signal. In some aspects, the sidelink message transmitter 1250 is capable of, configured to, or operable to support a means for transmitting a second sidelink message over a third time resource based on transmitting the first signal in the first AGC resource, where the third time resource occurs after the second time resource, and where the second time resource occurs after the first time resource.

In some aspects, the second time resource is contiguous with the second AGC resource.

In some aspects, the second time resource is non-contiguous with the third time resource.

In some aspects, the second sidelink message is associated with the control channel or the shared channel.

Figure 13:
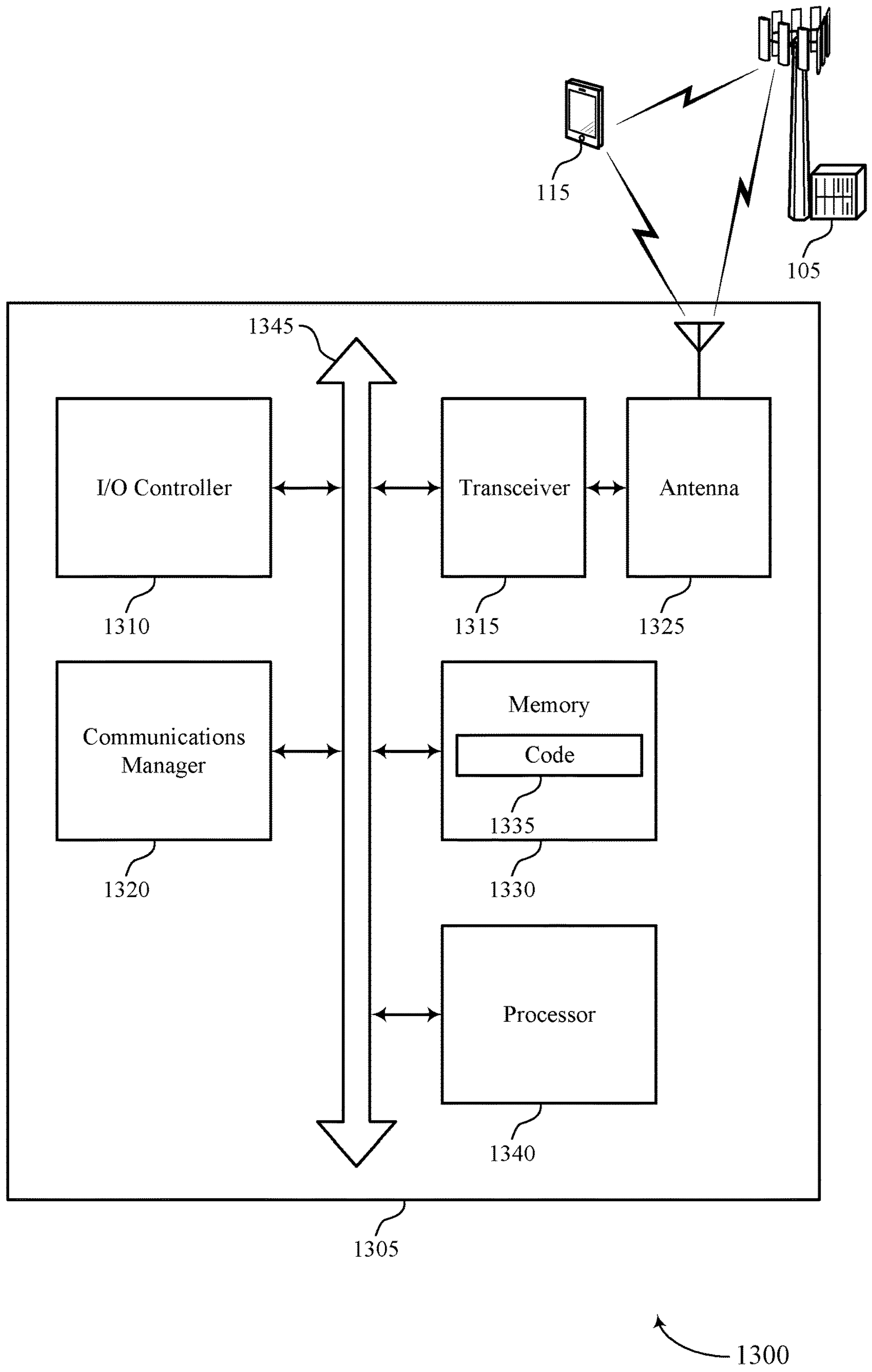
FIG. 13 shows a diagram of a system including a device that supports automatic gain control designs for sidelink feedback in accordance with one or more aspects of the present disclosure.

FIG. 13 shows a diagram of a system 1300 including a device 1305 that supports automatic gain control designs for sidelink feedback in accordance with one or more aspects of the present disclosure. The device 1305 may be an aspect of or include the components of a device 1005, a device 1105, or a UE 115 as described herein. The device 1305 may communicate (e.g., wirelessly) with one or more network entities 105, one or more UEs 115, or any combination thereof. The device 1305 may include components for bi-directional voice and data communications including components for transmitting and receiving communications, such as a communications manager 1320, an input/output (I/O) controller 1310, a transceiver 1315, an antenna 1325, at least one memory 1330, code 1335, and at least one processor 1340. These components may be in electronic communication or otherwise coupled (e.g., operatively, communicatively, functionally, electronically, electrically) via one or more buses (e.g., a bus 1345).

The I/O controller 1310 may manage input and output signals for the device 1305. The I/O controller 1310 may also manage peripherals not integrated into the device 1305. In some cases, the I/O controller 1310 may represent a physical connection or port to an external peripheral. In some cases, the I/O controller 1310 may utilize an operating system such as iOS®, ANDROID®, MS-DOS®, MS-WINDOWS®, OS/2®, UNIX®, LINUX®, or another known operating system. Additionally or alternatively, the I/O controller 1310 may represent or interact with a modem, a keyboard, a mouse, a touchscreen, or a similar device. In some cases, the I/O controller 1310 may be implemented as part of one or more processors, such as the at least one processor 1340. In some cases, a user may interact with the device 1305 via the I/O controller 1310 or via hardware components controlled by the I/O controller 1310.

In some cases, the device 1305 may include a single antenna 1325. However, in some other cases, the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For instance, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an aspect of a transmitter 1015, a transmitter 1115, a receiver 1010, a receiver 1110, or any combination thereof or component thereof, as described herein.

The at least one memory 1330 may include random access memory (RAM) and read-only memory (ROM). The at least one memory 1330 may store computer-readable, computer-executable code 1335 including instructions that, when executed by the at least one processor 1340, cause the device 1305 to perform various functions described herein. The code 1335 may be stored in a non-transitory computer-readable medium such as system memory or another type of memory. In some cases, the code 1335 may not be directly executable by the at least one processor 1340 but may cause a computer (e.g., when compiled and executed) to perform functions described herein. In some cases, the at least one memory 1330 may contain, among other things, a basic I/O system (BIOS) which may control basic hardware or software operation such as the interaction with peripheral components or devices.

The at least one processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 1340 may be configured to operate a memory array using a memory controller. In some other cases, a memory controller may be integrated into the at least one processor 1340. The at least one processor 1340 may be configured to execute computer-readable instructions stored in a memory (e.g., the at least one memory 1330) to cause the device 1305 to perform various functions (e.g., functions or tasks supporting automatic gain control designs for sidelink feedback). For instance, the device 1305 or a component of the device 1305 may include at least one processor 1340 and at least one memory 1330 coupled with or to the at least one processor 1340, the at least one processor 1340 and at least one memory 1330 configured to perform various functions described herein. In some aspects, the at least one processor 1340 may include multiple processors and the at least one memory 1330 may include multiple memories. One or more of the multiple processors may be coupled with one or more of the multiple memories, which may, individually or collectively, be configured to perform various functions herein.

The communications manager 1320 may support wireless communications in accordance with aspects as disclosed herein. For instance, the communications manager 1320 is capable of, configured to, or operable to support a means for receiving a signal in an automatic gain control (AGC) resource. The communications manager 1320 is capable of, configured to, or operable to support a means for receiving a first PSFCH message based on a gain for reception of the first PSFCH message, where the gain for reception of the first PSFCH message is based on receiving the signal, where the first PSFCH message is one of a set of multiple PSFCH messages that are time-division multiplexed over a set of multiple contiguous time resources, where a starting time resource of the set of multiple contiguous time resources is contiguous with the AGC resource, and where a first time period spanned by the AGC resource is greater than a second time period spanned by each PSFCH message of the set of multiple PSFCH messages.

Additionally, or alternatively, the communications manager 1320 may support wireless communications in accordance with aspects as disclosed herein. For instance, the communications manager 1320 is capable of, configured to, or operable to support a means for receiving a first signal in a first automatic gain control (AGC) resource. The communications manager 1320 is capable of, configured to, or operable to support a means for receiving a first sidelink message over a first time resource contiguous with the first AGC resource using a gain for reception of the first sidelink message, where the gain is based on based on receiving the first signal, and where the first sidelink message is associated with control channel or a shared channel. The communications manager 1320 is capable of, configured to, or operable to support a means for transmitting a second signal in a second AGC resource. The communications manager 1320 is capable of, configured to, or operable to support a means for transmitting a physical sidelink feedback channel (PSFCH) message over a second time resource occurring after the second AGC resource based on transmitting the second signal. The communications manager 1320 is capable of, configured to, or operable to support a means for receiving a second sidelink message over a third time resource using the gain based on receiving the first signal, where the third time resource occurs after the second time resource, and where the second time resource occurs after the first time resource.

Additionally, or alternatively, the communications manager 1320 may support wireless communications in accordance with aspects as disclosed herein. For instance, the communications manager 1320 is capable of, configured to, or operable to support a means for transmitting a signal in an automatic gain control (AGC) resource. The communications manager 1320 is capable of, configured to, or operable to support a means for transmitting a first PSFCH message based on transmitting the signal in the AGC resource, where the first PSFCH message is one of a set of multiple PSFCH messages that are time-division multiplexed over a set of multiple contiguous time resources, where a starting time resource of the set of multiple contiguous time resources is contiguous with the AGC resource, and where a first time period spanned by the AGC resource is greater than a second time period spanned by each PSFCH message of the set of multiple PSFCH messages.

Additionally, or alternatively, the communications manager 1320 may support wireless communications in accordance with aspects as disclosed herein. For instance, the communications manager 1320 is capable of, configured to, or operable to support a means for transmitting a first signal in a first automatic gain control (AGC) resource. The communications manager 1320 is capable of, configured to, or operable to support a means for transmitting a first sidelink message over a first time resource contiguous with the first AGC resource, where the first sidelink message is associated with a control channel or a shared channel. The communications manager 1320 is capable of, configured to, or operable to support a means for receiving a second signal in a second AGC resource. The communications manager 1320 is capable of, configured to, or operable to support a means for receiving a physical sidelink feedback channel (PSFCH) message over a second time resource occurring after the second AGC resource based on a gain for reception of the PSFCH message, where the gain is based on receiving the second signal. The communications manager 1320 is capable of, configured to, or operable to support a means for transmitting a second sidelink message over a third time resource based on transmitting the first signal in the first AGC resource, where the third time resource occurs after the second time resource, and where the second time resource occurs after the first time resource.

By including or configuring the communications manager 1320 in accordance with aspects as described herein, the device 1305 may support techniques for a greater quantity of resources to be utilized in an AGC period used for communicating PSFCH messages (e.g., via time-division multiplexing of multiple PSFCH messages and/or communicating PSCCH and/or PSSCH messages within the AGC period).

In some aspects, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, In some aspects, one or more functions described with reference to the communications manager 1320 may be supported by or performed by the at least one processor 1340, the at least one memory 1330, the code 1335, or any combination thereof. For instance, the code 1335 may include instructions executable by the at least one processor 1340 to cause the device 1305 to perform various aspects of automatic gain control designs for sidelink feedback as described herein, or the at least one processor 1340 and the at least one memory 1330 may be otherwise configured to, individually or collectively, perform or support such operations.

Figure 14:
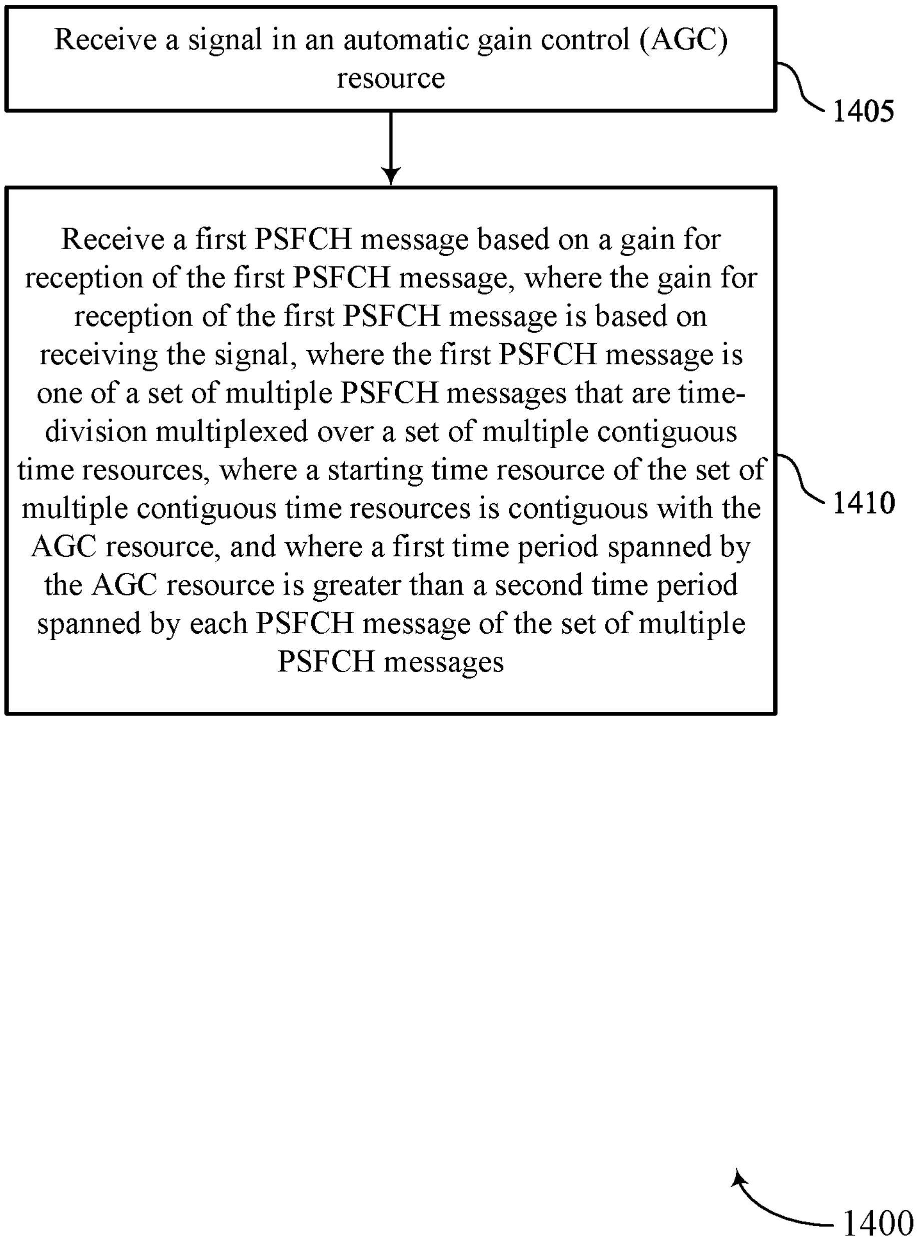
FIGS. 14 through 17 show flowcharts illustrating methods that support automatic gain control designs for sidelink feedback in accordance with one or more aspects of the present disclosure.

FIG. 14 shows a flowchart illustrating a method 1400 that supports automatic gain control designs for sidelink feedback in accordance with aspects of the present disclosure. The operations of the method 1400 may be implemented by a UE or its components as described herein. For instance, the operations of the method 1400 may be performed by a UE 115 as described with reference to FIGS. 1 through 13. In some aspects, a UE may execute a set of instructions to control the functional elements of the UE to perform the described functions. Additionally, or alternatively, the UE may perform aspects of the described functions using special-purpose hardware.

At 1405, the method may include receiving a signal in an automatic gain control (AGC) resource. The operations of block 1405 may be performed in accordance with aspects as disclosed herein. In some aspects, aspects of the operations of 1405 may be performed by an AGC signal receiver 1225 as described with reference to FIG. 12.

At 1410, the method may include receiving a first PSFCH message based on a gain for reception of the first PSFCH message, where the gain for reception of the first PSFCH message is based on receiving the signal, where the first PSFCH message is one of a set of multiple PSFCH messages that are time-division multiplexed over a set of multiple contiguous time resources, where a starting time resource of the set of multiple contiguous time resources is contiguous with the AGC resource, and where a first time period spanned by the AGC resource is greater than a second time period spanned by each PSFCH message of the set of multiple PSFCH messages. The operations of block 1410 may be performed in accordance with aspects as disclosed herein. In some aspects, aspects of the operations of 1410 may be performed by an PSFCH message receiver 1230 as described with reference to FIG. 12.

Figure 15:
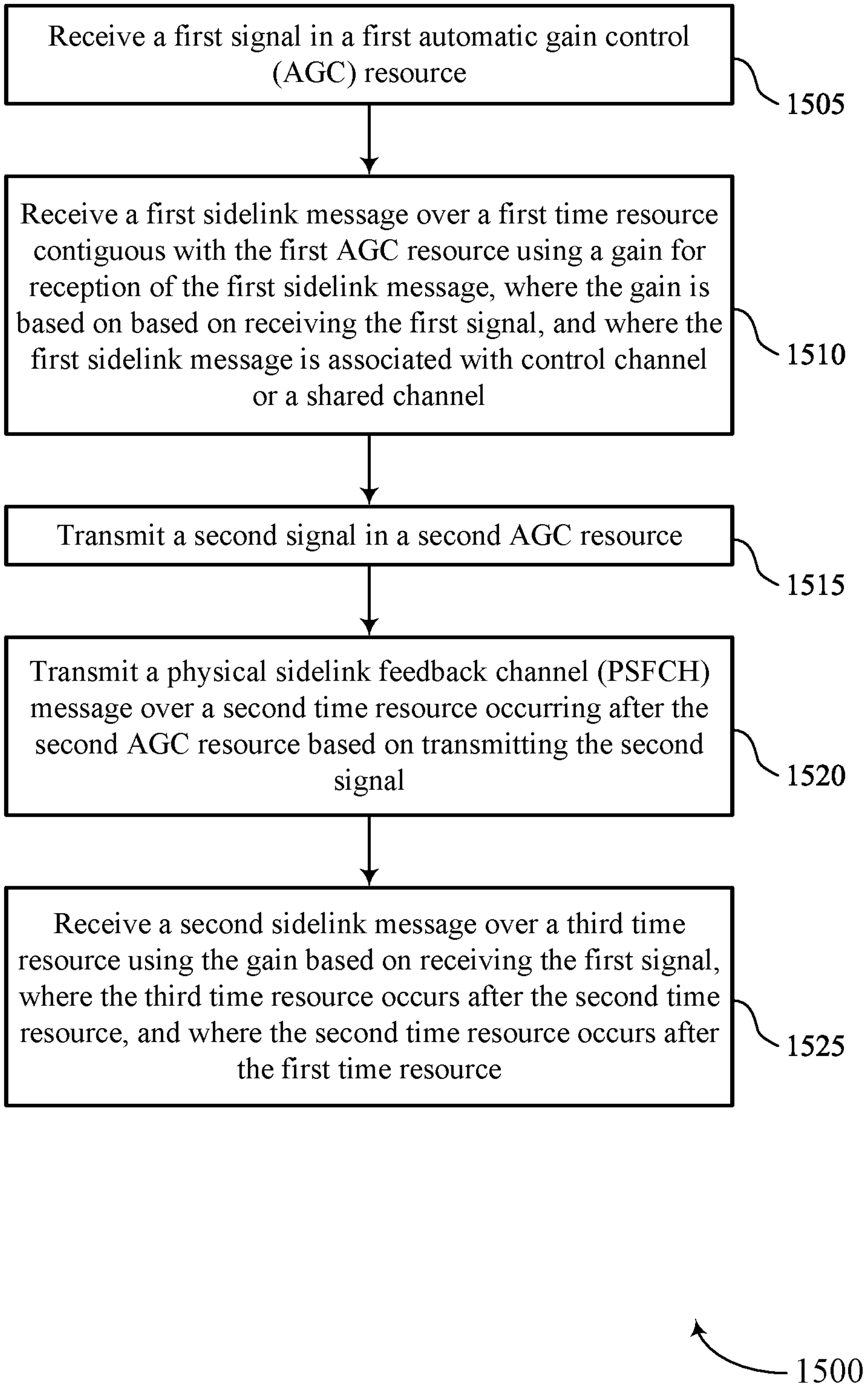

FIG. 15 shows a flowchart illustrating a method 1500 that supports automatic gain control designs for sidelink feedback in accordance with aspects of the present disclosure. The operations of the method 1500 may be implemented by a UE or its components as described herein. For instance, the operations of the method 1500 may be performed by a UE 115 as described with reference to FIGS. 1 through 13. In some aspects, a UE may execute a set of instructions to control the functional elements of the UE to perform the described functions. Additionally, or alternatively, the UE may perform aspects of the described functions using special-purpose hardware.

At 1505, the method may include receiving a first signal in a first automatic gain control (AGC) resource. The operations of block 1505 may be performed in accordance with aspects as disclosed herein. In some aspects, aspects of the operations of 1505 may be performed by an AGC signal receiver 1225 as described with reference to FIG. 12.

At 1510, the method may include receiving a first sidelink message over a first time resource contiguous with the first AGC resource using a gain for reception of the first sidelink message, where the gain is based on based on receiving the first signal, and where the first sidelink message is associated with control channel or a shared channel. The operations of block 1510 may be performed in accordance with aspects as disclosed herein. In some aspects, aspects of the operations of 1510 may be performed by a sidelink message receiver 1235 as described with reference to FIG. 12.

At 1515, the method may include transmitting a second signal in a second AGC resource. The operations of block 1515 may be performed in accordance with aspects as disclosed herein. In some aspects, aspects of the operations of 1515 may be performed by an AGC signal transmitter 1240 as described with reference to FIG. 12.

At 1520, the method may include transmitting a physical sidelink feedback channel (PSFCH) message over a second time resource occurring after the second AGC resource based on transmitting the second signal. The operations of block 1520 may be performed in accordance with aspects as disclosed herein. In some aspects, aspects of the operations of 1520 may be performed by an PSFCH message transmitter 1245 as described with reference to FIG. 12.

At 1525, the method may include receiving a second sidelink message over a third time resource using the gain based on receiving the first signal, where the third time resource occurs after the second time resource, and where the second time resource occurs after the first time resource. The operations of block 1525 may be performed in accordance with aspects as disclosed herein. In some aspects, aspects of the operations of 1525 may be performed by a sidelink message receiver 1235 as described with reference to FIG. 12.

Figure 16:
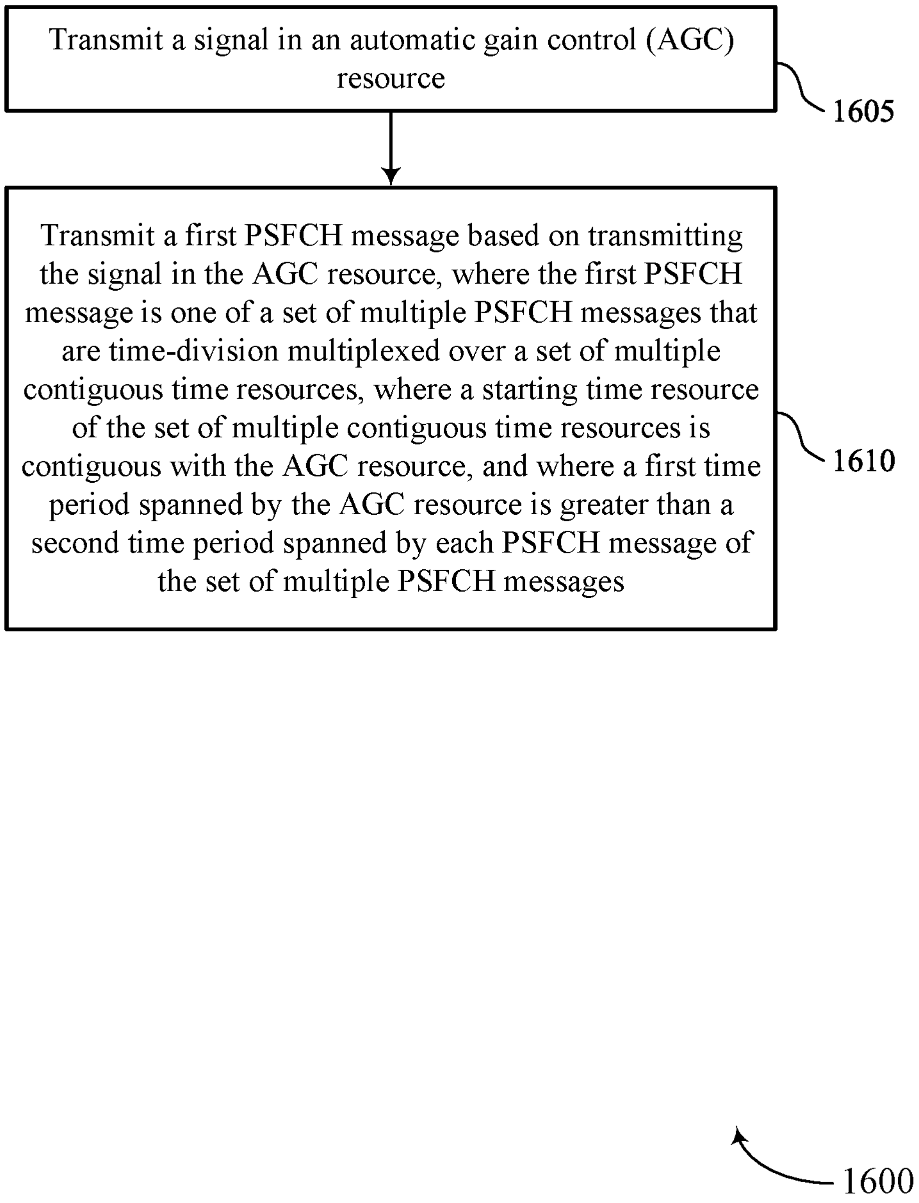

FIG. 16 shows a flowchart illustrating a method 1600 that supports automatic gain control designs for sidelink feedback in accordance with aspects of the present disclosure. The operations of the method 1600 may be implemented by a UE or its components as described herein. For instance, the operations of the method 1600 may be performed by a UE 115 as described with reference to FIGS. 1 through 13. In some aspects, a UE may execute a set of instructions to control the functional elements of the UE to perform the described functions. Additionally, or alternatively, the UE may perform aspects of the described functions using special-purpose hardware.

At 1605, the method may include transmitting a signal in an automatic gain control (AGC) resource. The operations of block 1605 may be performed in accordance with aspects as disclosed herein. In some aspects, aspects of the operations of 1605 may be performed by an AGC signal transmitter 1240 as described with reference to FIG. 12.

At 1610, the method may include transmitting a first PSFCH message based on transmitting the signal in the AGC resource, where the first PSFCH message is one of a set of multiple PSFCH messages that are time-division multiplexed over a set of multiple contiguous time resources, where a starting time resource of the set of multiple contiguous time resources is contiguous with the AGC resource, and where a first time period spanned by the AGC resource is greater than a second time period spanned by each PSFCH message of the set of multiple PSFCH messages. The operations of block 1610 may be performed in accordance with aspects as disclosed herein. In some aspects, aspects of the operations of 1610 may be performed by an PSFCH message transmitter 1245 as described with reference to FIG. 12.

Figure 17:
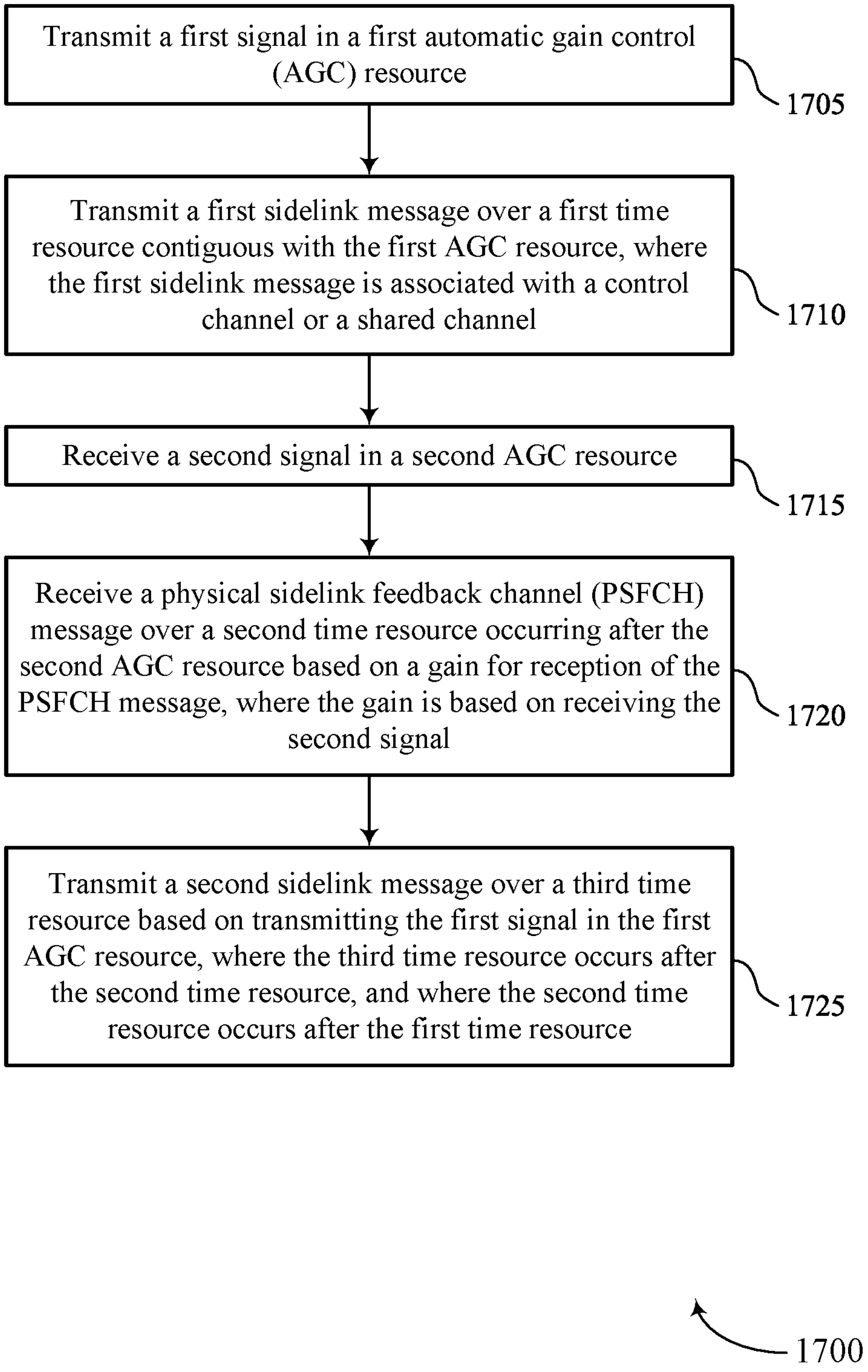

FIG. 17 shows a flowchart illustrating a method 1700 that supports automatic gain control designs for sidelink feedback in accordance with aspects of the present disclosure. The operations of the method 1700 may be implemented by a UE or its components as described herein. For instance, the operations of the method 1700 may be performed by a UE 115 as described with reference to FIGS. 1 through 13. In some aspects, a UE may execute a set of instructions to control the functional elements of the UE to perform the described functions. Additionally, or alternatively, the UE may perform aspects of the described functions using special-purpose hardware.

At 1705, the method may include transmitting a first signal in a first automatic gain control (AGC) resource. The operations of block 1705 may be performed in accordance with aspects as disclosed herein. In some aspects, aspects of the operations of 1705 may be performed by an AGC signal transmitter 1240 as described with reference to FIG. 12.

At 1710, the method may include transmitting a first sidelink message over a first time resource contiguous with the first AGC resource, where the first sidelink message is associated with a control channel or a shared channel. The operations of block 1710 may be performed in accordance with aspects as disclosed herein. In some aspects, aspects of the operations of 1710 may be performed by a sidelink message transmitter 1250 as described with reference to FIG. 12.

At 1715, the method may include receiving a second signal in a second AGC resource. The operations of block 1715 may be performed in accordance with aspects as disclosed herein. In some aspects, aspects of the operations of 1715 may be performed by an AGC signal receiver 1225 as described with reference to FIG. 12.

At 1720, the method may include receiving a physical sidelink feedback channel (PSFCH) message over a second time resource occurring after the second AGC resource based on a gain for reception of the PSFCH message, where the gain is based on receiving the second signal. The operations of block 1720 may be performed in accordance with aspects as disclosed herein. In some aspects, aspects of the operations of 1720 may be performed by an PSFCH message receiver 1230 as described with reference to FIG. 12.

At 1725, the method may include transmitting a second sidelink message over a third time resource based on transmitting the first signal in the first AGC resource, where the third time resource occurs after the second time resource, and where the second time resource occurs after the first time resource. The operations of block 1725 may be performed in accordance with aspects as disclosed herein. In some aspects, aspects of the operations of 1725 may be performed by a sidelink message transmitter 1250 as described with reference to FIG. 12.

The following provides an overview of aspects of the present disclosure:

Aspect 1: A method for wireless communications, comprising: receiving a signal in an automatic gain control (AGC) resource; and receiving a first PSFCH message based at least in part on a gain for reception of the first PSFCH message, wherein the gain for reception of the first PSFCH message is based at least in part on receiving the signal, wherein the first PSFCH message is one of a plurality of PSFCH messages that are time-division multiplexed over a plurality of contiguous time resources, wherein a starting time resource of the plurality of contiguous time resources is contiguous with the AGC resource, and wherein a first time period spanned by the AGC resource is greater than a second time period spanned by each PSFCH message of the plurality of PSFCH messages.

Aspect 2: The method of aspect 1, wherein the AGC resource comprises a plurality of symbol sets, each symbol set of the plurality of symbol sets maps to a respective time resource of the plurality of contiguous time resources, and receiving the first PSFCH message over a first time resource of the plurality of contiguous time resources is based at least in part on the first time resource mapping to a symbol set of the plurality of symbol sets.

Aspect 3: The method of any of aspects 1 through 2, wherein the AGC resource comprises a plurality of sets of contiguous resource blocks, each set of contiguous resource blocks maps to a respective time resource of the plurality of contiguous time resources, and receiving the first PSFCH message over a first time resource of the plurality of contiguous time resources is based at least in part on the first time resource mapping to a set of contiguous resource blocks of the plurality of sets of contiguous resource blocks.

Aspect 4: The method of any of aspects 1 through 3, wherein receiving the signal is based at least in part on a first frequency comb index of a plurality of frequency comb indices, each frequency comb index of the plurality of frequency comb indices maps to a respective time resource of the plurality of contiguous time resources, and receiving the first PSFCH message over a first time resource of the plurality of contiguous time resources is based at least in part on the first time resource mapping to the first frequency comb index of the plurality of frequency comb indices.

Aspect 5: The method of any of aspects 1 through 4, wherein receiving the signal is based at least in part on a first sequence index of a plurality of sequence indices, each sequence index of the plurality of sequence indices maps to a respective time resource of the plurality of contiguous time resources, and receiving the first PSFCH message over a first time resource of the plurality of contiguous time resources is based at least in part on the first time resource mapping to the first sequence index of the plurality of sequence indices.

Aspect 6: The method of aspect 5, wherein each sequence index of the plurality of sequence indices comprises a respective cyclic shift index.

Aspect 7: The method of any of aspects 1 through 6, wherein the signal comprises a reference signal associated with a Chu sequence or a pseudo-random sequence.

Aspect 8: The method of any of aspects 1 through 7, wherein a first bandwidth spanned by the signal in the AGC resource is greater than a respective bandwidth spanned by each of the plurality of PSFCH messages.

Aspect 9: The method of any of aspects 1 through 8, wherein the AGC resource spans a first duration of a slot, a second duration of a plurality of symbols, or both.

Aspect 10: The method of any of aspects 1 through 9 wherein each time resource of the plurality of contiguous time resources spans a duration of a symbol or a multiple of the duration of the symbol.

Aspect 11: A method for wireless communications, comprising: receiving a first signal in a first automatic gain control (AGC) resource; receiving a first sidelink message over a first time resource contiguous with the first AGC resource using a gain for reception of the first sidelink message, wherein the gain is based at least in part on based at least in part on receiving the first signal, and wherein the first sidelink message is associated with control channel or a shared channel; transmitting a second signal in a second AGC resource; transmitting a physical sidelink feedback channel (PSFCH) message over a second time resource occurring after the second AGC resource based at least in part on transmitting the second signal; and receiving a second sidelink message over a third time resource using the gain based at least in part on receiving the first signal, wherein the third time resource occurs after the second time resource, and wherein the second time resource occurs after the first time resource.

Aspect 12: The method of aspect 11, wherein the second time resource is contiguous with the second AGC resource.

Aspect 13: The method of any of aspects 11 through 12, wherein the second time resource is non-contiguous with the third time resource.

Aspect 14: The method of any of aspects 11 through 13, wherein the first time resource, the second time resource, and the third time resource each span a duration of a symbol or a multiple of the duration of the symbol.

Aspect 15: The method of any of aspects 11 through 14, wherein the first AGC resource and the second AGC resource each span a duration of a slot.

Aspect 16: The method of any of aspects 11 through 15, wherein the second sidelink message is associated with the control channel or the shared channel.

Aspect 17: A method for wireless communications, comprising: transmitting a signal in an automatic gain control (AGC) resource; transmitting a first PSFCH message based at least in part on transmitting the signal in the AGC resource, wherein the first PSFCH message is one of a plurality of PSFCH messages that are time-division multiplexed over a plurality of contiguous time resources, wherein a starting time resource of the plurality of contiguous time resources is contiguous with the AGC resource, and wherein a first time period spanned by the AGC resource is greater than a second time period spanned by each PSFCH message of the plurality of PSFCH messages.

Aspect 18: The method of aspect 17, wherein the AGC resource comprises a plurality of symbol sets, each symbol set of the plurality of symbol sets maps to a respective time resource of the plurality of contiguous time resources, and transmitting the first PSFCH message over a first time resource of the plurality of contiguous time resources is based at least in part on the first time resource mapping to a symbol set of the plurality of symbol sets.

Aspect 19: The method of any of aspects 17 through 18, wherein the AGC resource comprises a plurality of sets of contiguous resource blocks, each set of contiguous resource blocks maps to a respective time resource of the plurality of contiguous time resources, and transmitting the first PSFCH message over a first time resource of the plurality of contiguous time resources is based at least in part on the first time resource mapping to a set of contiguous resource blocks of the plurality of sets of contiguous resource blocks.

Aspect 20: The method of any of aspects 17 through 19, wherein transmitting the signal is based at least in part on a first frequency comb index of a plurality of frequency comb indices, each frequency comb index of the plurality of frequency comb indices maps to a respective time resource of the plurality of contiguous time resources, and transmitting the first PSFCH message over a first time resource of the plurality of contiguous time resources is based at least in part on the first time resource mapping to the first frequency comb index of the plurality of frequency comb indices.

Aspect 21: The method of any of aspects 17 through 20, wherein transmitting the signal is based at least in part on a first sequence index of a plurality of sequence indices, each sequence index of the plurality of sequence indices maps to a respective time resource of the plurality of contiguous time resources, and transmitting the first PSFCH message over a first time resource of the plurality of contiguous time resources is based at least in part on the first time resource mapping to the first sequence index of the plurality of sequence indices.

Aspect 22: The method of aspect 21, wherein each sequence index of the plurality of sequence indices comprises a respective cyclic shift index.

Aspect 23: The method of any of aspects 17 through 22, wherein the signal comprises a reference signal associated with a Chu sequence or a pseudo-random sequence.

Aspect 24: The method of any of aspects 17 through 23, wherein a first bandwidth spanned by the signal in the AGC resource is greater than a second bandwidth spanned by the plurality of PSFCH messages.

Aspect 25: The method of any of aspects 17 through 24, wherein each time resource of the plurality of contiguous time resources spans a duration of a symbol or a multiple of the duration of the symbol.

Aspect 26: The method of any of aspects 17 through 25, wherein the AGC resource spans a first duration of a slot, a second duration of a plurality of symbols, or both.

Aspect 27: A method for wireless communications, comprising: transmitting a first signal in a first automatic gain control (AGC) resource; transmitting a first sidelink message over a first time resource contiguous with the first AGC resource, wherein the first sidelink message is associated with a control channel or a shared channel; receiving a second signal in a second AGC resource; receiving a physical sidelink feedback channel (PSFCH) message over a second time resource occurring after the second AGC resource based at least in part on a gain for reception of the PSFCH message, wherein the gain is based at least in part on receiving the second signal; and transmitting a second sidelink message over a third time resource based at least in part on transmitting the first signal in the first AGC resource, wherein the third time resource occurs after the second time resource, and wherein the second time resource occurs after the first time resource.

Aspect 28: The method of aspect 27, wherein the second time resource is contiguous with the second AGC resource.

Aspect 29: The method of any of aspects 27 through 28, wherein the second time resource is non-contiguous with the third time resource.

Aspect 30: The method of any of aspects 27 through 29, wherein the second sidelink message is associated with the control channel or the shared channel.

Aspect 31: An apparatus for wireless communications, comprising one or more memories storing processor-executable code, and one or more processors coupled with the one or more memories and operable to execute the code to cause the one or more processors, individually or collectively, to perform a method of any of aspects 1 through 10.

Aspect 32: An apparatus for wireless communications, comprising at least one means for performing a method of any of aspects 1 through 10.

Aspect 33: A non-transitory computer-readable medium storing code for wireless communications, the code comprising instructions executable by a processor to perform a method of any of aspects 1 through 10.

Aspect 34: An apparatus for wireless communications, comprising one or more memories storing processor-executable code, and one or more processors coupled with the one or more memories and operable to execute the code to cause the one or more processors, individually or collectively, to perform a method of any of aspects 11 through 16.

Aspect 35: An apparatus for wireless communications, comprising at least one means for performing a method of any of aspects 11 through 16.

Aspect 36: A non-transitory computer-readable medium storing code for wireless communications, the code comprising instructions executable by a processor to perform a method of any of aspects 11 through 16.

Aspect 37: An apparatus for wireless communications, comprising one or more memories storing processor-executable code, and one or more processors coupled with the one or more memories and operable to execute the code to cause the one or more processors, individually or collectively, to cause the apparatus to perform a method of any of aspects 17 through 26.

Aspect 38: An apparatus for wireless communications, comprising at least one means for performing a method of any of aspects 17 through 26.

Aspect 39: A non-transitory computer-readable medium storing code for wireless communications, the code comprising instructions executable by a processor to perform a method of any of aspects 17 through 26.

Aspect 40: An apparatus for wireless communications, comprising one or more memories storing processor-executable code, and one or more processors coupled with the one or more memories and operable to execute the code to cause the one or more processors, individually or collectively, to execute the code to cause the apparatus to perform a method of any of aspects 27 through 30.

Aspect 41: An apparatus for wireless communications, comprising at least one means for performing a method of any of aspects 27 through 30.

Aspect 42: A non-transitory computer-readable medium storing code for wireless communications, the code comprising instructions executable by a processor to perform a method of any of aspects 27 through 30.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For instance, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For instance, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For instance, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For instance, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, For instance, a list of at least one of A, B, or C means A or B or C or AB or AC or BC or ABC (i.e., A and B and C). Also, as used herein, the phrase "based on" shall not be construed as a reference to a closed set of conditions. For instance, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For instance, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For instance, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For instance, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the present disclosure. Thus, the disclosure is not limited to the examples and designs described herein but is to be accorded the broadest scope consistent with the principles and novel features disclosed herein.

What is claimed is:

1. An apparatus, comprising:

one or more memories storing processor-executable code; and one or more processors coupled with the one or more memories and operable to execute the code to cause the one or more processors, individually or collectively, to:

receive a signal in an automatic gain control (AGC) resource; and receive a first physical sidelink feedback channel (PSFCH) message based at least in part on a gain for reception of the first PSFCH message, wherein the gain for reception of the first PSFCH message is based at least in part on receiving the signal, wherein the first PSFCH message is one of a plurality of PSFCH messages that are time-division multiplexed over a plurality of contiguous time resources, wherein a starting time resource of the plurality of contiguous time resources is contiguous with the AGC resource, and wherein a first time period spanned by the AGC resource is greater than a second time period spanned by each PSFCH message of the plurality of PSFCH messages.

2. The apparatus of claim 1, wherein:

the AGC resource comprises a plurality of symbol sets, each symbol set of the plurality of symbol sets maps to a respective time resource of the plurality of contiguous time resources, and receiving the first PSFCH message over a first time resource of the plurality of contiguous time resources is based at least in part on the first time resource mapping to a symbol set of the plurality of symbol sets.

3. The apparatus of claim 1, wherein:

the AGC resource comprises a plurality of sets of contiguous resource blocks, each set of contiguous resource blocks maps to a respective time resource of the plurality of contiguous time resources, and receiving the first PSFCH message over a first time resource of the plurality of contiguous time resources is based at least in part on the first time resource mapping to a set of contiguous resource blocks of the plurality of sets of contiguous resource blocks.

4. The apparatus of claim 1, wherein:

receiving the signal is based at least in part on a first frequency comb index of a plurality of frequency comb indices, each frequency comb index of the plurality of frequency comb indices maps to a respective time resource of the plurality of contiguous time resources, and receiving the first PSFCH message over a first time resource of the plurality of contiguous time resources is based at least in part on the first time resource mapping to the first frequency comb index of the plurality of frequency comb indices.

5. The apparatus of claim 1, wherein:

receiving the signal is based at least in part on a first sequence index of a plurality of sequence indices, each sequence index of the plurality of sequence indices maps to a respective time resource of the plurality of contiguous time resources, and receiving the first PSFCH message over a first time resource of the plurality of contiguous time resources is based at least in part on the first time resource mapping to the first sequence index of the plurality of sequence indices.

6. The apparatus of claim 5, wherein each sequence index of the plurality of sequence indices comprises a respective cyclic shift index.

7. The apparatus of claim 1, wherein the signal comprises a reference signal associated with a Chu sequence or a pseudo-random sequence.

8. The apparatus of claim 1, wherein a first bandwidth spanned by the signal in the AGC resource is greater than a respective bandwidth spanned by each of the plurality of PSFCH messages.

9. The apparatus of claim 1, wherein the AGC resource spans a first duration of a slot, a second duration of a plurality of symbols, or both.

10. The apparatus of claim 1, wherein each time resource of the plurality of contiguous time resources spans a duration of a symbol or a multiple of the duration of the symbol.

11. An apparatus, comprising:

one or more memories storing processor-executable code; and one or more processors coupled with the one or more memories and operable to execute the code to cause the one or more processors, individually or collectively, to:

transmit a signal in an automatic gain control (AGC) resource; and transmit a first physical sidelink feedback channel (PSFCH) message based at least in part on transmitting the signal in the AGC resource, wherein the first PSFCH message is one of a plurality of PSFCH messages that are time-division multiplexed over a plurality of contiguous time resources, wherein a starting time resource of the plurality of contiguous time resources is contiguous with the AGC resource, and wherein a first time period spanned by the AGC resource is greater than a second time period spanned by each PSFCH message of the plurality of PSFCH messages.

12. The apparatus of claim 11, wherein:

the AGC resource comprises a plurality of symbol sets, each symbol set of the plurality of symbol sets maps to a respective time resource of the plurality of contiguous time resources, and transmitting the first PSFCH message over a first time resource of the plurality of contiguous time resources is based at least in part on the first time resource mapping to a symbol set of the plurality of symbol sets.

13. The apparatus of claim 11, wherein:

the AGC resource comprises a plurality of sets of contiguous resource blocks, each set of contiguous resource blocks maps to a respective time resource of the plurality of contiguous time resources, and transmitting the first PSFCH message over a first time resource of the plurality of contiguous time resources is based at least in part on the first time resource mapping to a set of contiguous resource blocks of the plurality of sets of contiguous resource blocks.

14. The apparatus of claim 11, wherein:

transmitting the signal is based at least in part on a first frequency comb index of a plurality of frequency comb indices, each frequency comb index of the plurality of frequency comb indices maps to a respective time resource of the plurality of contiguous time resources, and transmitting the first PSFCH message over a first time resource of the plurality of contiguous time resources is based at least in part on the first time resource mapping to the first frequency comb index of the plurality of frequency comb indices.

15. The apparatus of claim 11, wherein:

transmitting the signal is based at least in part on a first sequence index of a plurality of sequence indices, each sequence index of the plurality of sequence indices maps to a respective time resource of the plurality of contiguous time resources, and transmitting the first PSFCH message over a first time resource of the plurality of contiguous time resources is based at least in part on the first time resource mapping to the first sequence index of the plurality of sequence indices.

16. The apparatus of claim 15, wherein each sequence index of the plurality of sequence indices comprises a respective cyclic shift index.

17. The apparatus of claim 11, wherein the signal comprises a reference signal associated with a Chu sequence or a pseudo-random sequence.

18. The apparatus of claim 11, wherein a first bandwidth spanned by the signal in the AGC resource is greater than a second bandwidth spanned by the plurality of PSFCH messages.

19. The apparatus of claim 11, wherein each time resource of the plurality of contiguous time resources spans a duration of a symbol or a multiple of the duration of the symbol.

20. The apparatus of claim 11, wherein the AGC resource spans a first duration of a slot, a second duration of a plurality of symbols, or both.

21. The apparatus of claim 11, wherein:

the AGC resource comprises a plurality of symbol sets, each symbol set of the plurality of symbol sets maps to a respective time resource of the plurality of contiguous time resources, and transmitting the first PSFCH message over a first time resource of the plurality of contiguous time resources is based at least in part on the first time resource mapping to a symbol set of the plurality of symbol sets.

22. The apparatus of claim 11, wherein:

the AGC resource comprises a plurality of sets of contiguous resource blocks, each set of contiguous resource blocks maps to a respective time resource of the plurality of contiguous time resources, and transmitting the first PSFCH message over a first time resource of the plurality of contiguous time resources is based at least in part on the first time resource mapping to a set of contiguous resource blocks of the plurality of sets of contiguous resource blocks.

23. The apparatus of claim 11, wherein:

transmitting the signal is based at least in part on a first frequency comb index of a plurality of frequency comb indices, each frequency comb index of the plurality of frequency comb indices maps to a respective time resource of the plurality of contiguous time resources, and transmitting the first PSFCH message over a first time resource of the plurality of contiguous time resources is based at least in part on the first time resource mapping to the first frequency comb index of the plurality of frequency comb indices.

24. A method, comprising:

receiving a signal in an automatic gain control (AGC) resource; and receiving a first physical sidelink feedback channel (PSFCH) message based at least in part on a gain for reception of the first PSFCH message, wherein the gain for reception of the first PSFCH message is based at least in part on receiving the signal, wherein the first PSFCH message is one of a plurality of PSFCH messages that are time-division multiplexed over a plurality of contiguous time resources, wherein a starting time resource of the plurality of contiguous time resources is contiguous with the AGC resource, and wherein a first time period spanned by the AGC resource is greater than a second time period spanned by each PSFCH message of the plurality of PSFCH messages.

25. The method of claim 24, wherein:

the AGC resource comprises a plurality of symbol sets, each symbol set of the plurality of symbol sets maps to a respective time resource of the plurality of contiguous time resources, and receiving the first PSFCH message over a first time resource of the plurality of contiguous time resources is based at least in part on the first time resource mapping to a symbol set of the plurality of symbol sets.

26. The method of claim 24, wherein:

the AGC resource comprises a plurality of sets of contiguous resource blocks, each set of contiguous resource blocks maps to a respective time resource of the plurality of contiguous time resources, and receiving the first PSFCH message over a first time resource of the plurality of contiguous time resources is based at least in part on the first time resource mapping to a set of contiguous resource blocks of the plurality of sets of contiguous resource blocks.

27. The method of claim 24, wherein:

receiving the signal is based at least in part on a first frequency comb index of a plurality of frequency comb indices, each frequency comb index of the plurality of frequency comb indices maps to a respective time resource of the plurality of contiguous time resources, and receiving the first PSFCH message over a first time resource of the plurality of contiguous time resources is based at least in part on the first time resource mapping to the first frequency comb index of the plurality of frequency comb indices.

28. The method of claim 24, wherein:

receiving the signal is based at least in part on a first sequence index of a plurality of sequence indices, each sequence index of the plurality of sequence indices maps to a respective time resource of the plurality of contiguous time resources, and receiving the first PSFCH message over a first time resource of the plurality of contiguous time resources is based at least in part on the first time resource mapping to the first sequence index of the plurality of sequence indices.

29. The method of claim 24, wherein a first bandwidth spanned by the signal in the AGC resource is greater than a respective bandwidth spanned by each of the plurality of PSFCH messages.

30. A method, comprising:

transmitting a signal in an automatic gain control (AGC) resource; and transmitting a first physical sidelink feedback channel (PSFCH) message based at least in part on transmitting the signal in the AGC resource, wherein the first PSFCH message is one of a plurality of PSFCH messages that are time-division multiplexed over a plurality of contiguous time resources, wherein a starting time resource of the plurality of contiguous time resources is contiguous with the AGC resource, and wherein a first time period spanned by the AGC resource is greater than a second time period spanned by each PSFCH message of the plurality of PSFCH messages.

* * * * *